(12) United States Patent
He et al.

(10) Patent No.: US 12,557,046 B2
(45) Date of Patent: Feb. 17, 2026

(54) SYSTEMS, METHODS, AND DEVICES FOR INITIAL ACCESS SIGNALING IN A WIRELESS COMMUNICATION NETWORK

(71) Applicant: Apple Inc., Cupertino, CA (US)

(72) Inventors: Hong He, San Jose, CA (US);
Chunxuan Ye, San Diego, CA (US);
Dawei Zhang, Saratoga, CA (US);
Haitong Sun, Cupertino, CA (US);
Oghenekome Oteri, San Diego, CA (US); Seyed Ali Akbar Fakoorian, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/774,178

(22) PCT Filed: Sep. 24, 2021

(86) PCT No.: PCT/CN2021/120223
§ 371 (c)(1),
(2) Date: Mar. 30, 2023

(87) PCT Pub. No.: WO2023/044728
PCT Pub. Date: Mar. 30, 2023

(65) Prior Publication Data
US 2024/0172148 A1 May 23, 2024

(51) Int. Cl.
*H04W 56/00* (2009.01)
*H04W 8/00* (2009.01)
(Continued)

(52) U.S. Cl.
CPC ....... *H04W 56/0015* (2013.01); *H04W 8/005* (2013.01); *H04W 24/08* (2013.01); *H04W 74/0816* (2013.01)

(58) Field of Classification Search
CPC . H04W 56/0015; H04W 8/005; H04W 24/08; H04W 74/0816; H04W 48/12;
(Continued)

(56) References Cited

U.S. PATENT DOCUMENTS 10,707,979 B2  7/2020  Ananda et al.
10,951,359 B2  3/2021  Huang et al.
(Continued)

FOREIGN PATENT DOCUMENTS

CN   110692275 A   1/2020
CN   111727637 A   9/2020
EP     4195575 A1   6/2023

OTHER PUBLICATIONS

CATT; "Initial access aspects for up to 71GHz operation"; 3GPP TSG RAN WGI #105-e; RI-2104507; May 19, 2021.
(Continued)

*Primary Examiner* — Walli Z Butt
(74) *Attorney, Agent, or Firm* — Eschweiler & Potashnik, LLC; Ningjiao Zhang

(57) ABSTRACT

Techniques described herein may enable base stations and user equipment (UEs) to implement initial access related signaling that may vary the number of synchronization signal blocks (SSBs) transmitted by a base station to better ensure that control frame transmissions (e.g., 120 kilohertz (kHz) subcarrier spacing (SCS) transmissions) are not overly encumbered by SSBs. A base station may indicate whether a discovery burst transmission window (DBTW) is enabled or disabled, whether listen-before-talk (LBT) is enabled or disabled, and whether transmissions correspond
(Continued)

to a licensed band, unlicensed band, or combination thereof. The base station may also indicate a number of candidate SSBs per DBTW and/or which SSBs/SSB groups are active (e.g., actually transmitted) per discovery burst (DB).

29 Claims, 14 Drawing Sheets

(51) Int. Cl.
*H04W 24/08* (2009.01)
*H04W 74/0816* (2024.01)

(58) Field of Classification Search
CPC .......... H04W 74/0808; H04W 74/0891; H04L 5/0053; H04L 1/1614
See application file for complete search history.

(56) References Cited

U.S. PATENT DOCUMENTS

| | | | |
|---|---|---|---|
| 10,952,231 | B2 | 3/2021 | Liou |
| 11,818,773 | B2 | 11/2023 | Mondal et al. |
| 2019/0098590 | A1 | 3/2019 | Nam et al. |
| 2020/0053637 | A1 | 2/2020 | Tsai et al. |
| 2020/0196306 | A1 | 6/2020 | Si et al. |
| 2021/0028945 | A1 | 1/2021 | Lam et al. |
| 2021/0160870 | A1 | 5/2021 | Si et al. |
| 2021/0219249 | A1 | 7/2021 | Tang |
| 2021/0243680 | A1 | 8/2021 | Harada |
| 2022/0078819 | A1 | 3/2022 | Taherzadeh et al. |
| 2022/0304015 | A1 | 9/2022 | Yi et al. |
| 2023/0276386 | A1 | 8/2023 | Kim et al. |
| 2024/0057159 | A1* | 2/2024 | Calcev .................. H04W 48/16 |
| 2024/0179689 | A1 | 5/2024 | Xiong et al. |
| 2024/0187177 | A1 | 6/2024 | He et al. |
| 2024/0195667 | A1* | 6/2024 | Khan Beigi .......... H04W 48/16 |
| 2024/0373458 | A1* | 11/2024 | Shibaike ............... H04W 74/08 |
| 2025/0168849 | A1 | 5/2025 | Lin et al. |

OTHER PUBLICATIONS

Moderator (Intel Corporation); "Issue Summary for initial access aspects of NR extension up to 71 GHz"; 3GPP TSG RAN WG1 Meeting #106-e; R1-2108206; Aug. 16, 2021.
NEC; "Discussion on initial access aspects supporting NR from 52.6 to 71 GHz"; 3GPP TSG RAN WGI #106-e; RI-2107149; Aug. 16, 2021.
NTT Docomo, Inc.; "Initial access aspects for NR from 52.6 to 71 GHz"; 3GPP TSG-RAN WG1 Meeting #106; R1-2107845; Aug. 16, 2021.
European Extended Search Report dated Apr. 14, 2025 in connection with Application No. 21957862.2.
PCT Search Report dated May 21, 2022 in connection with PCT Application No. PCT/CN2021/120400.
PCT Written Opinion dated May 27, 2022 in connection with PCT Application No. PCT/CN2021/120400.
Samsung; "Remaining details on remaining minimum system information delivery"; 3GPP TSG RAN WG1 Meeting NR#3; R1-1715910; Sep. 18, 2017.
5G; NR; Multiplexing and channel coding (3GPP TS 38.212 version 16.6.0 Release 16); ETSI TS 138 212 V16.6.0 (Aug. 2021).
5G; NR; Physical layer procedures for control (3GPP TS 38.213 version 16.6.0 Release 16); ETSI TS 138 213 V16.6.0 (Aug. 2021).
PCT Search Report dated Mar. 2, 2022 in connection with PCT Application No. PCT/CN2021/120223.
PCT Written Opinion dated Mar. 4, 2022 in connection with PCT Application No. PCT/CN2021/120223.
Moderator (Intel Corporation); Summary #3 of email discussion on initial access aspect of NR extension up to 71 Ghz; 3GPP TSG RAN WG1 Meeting #106-e; R1-2108480; Aug. 16, 2021.
U.S. Appl. No. 17/774,188, filed with the USPTO on May 4, 2022.
Notification Concerning Transmittal of International Preliminary Report on Patentability Mailed on Mar. 26, 2024 In Connection With Application No. PCT/CN2021/120400.
Ericsson; "Remaining minimum system information"; 3GPP TSG RAN WG1 Meeting AH 1801 R1-1800894; Jan. 22, 2018.
Qualcomm Incorporated; "Summary of Re1.15 maintenance for PDCCH and search space"; 3GPP TSG RAN WG1 Meeting #98 R1-1909521; Aug. 26, 2019.
Sony; "Considerations on initial access aspects for NR from 52.6 GHz to 71 GHz"; 3GPP TSG RAN WG1 #106-e R1-2106795; Aug. 16, 2021.
AT&T; "Remaining issues in DL/UL resource allocation"; 3GPP TSG RAN WG1 Meeting AH 1801 R1-1800577; Jan. 22, 2018.
Lenovo, Motorola Mobility; "Correlation on RMSI CORESET configuration"; 3GPP TSG RAN WG1 Meeting AH 1801 R1-1800399; Jan. 22, 2018.
Ericsson; "Initial Access Aspects" 3GPP TSG-RAN WG1 Meeting #106-e Tdoc R1-2107050; Aug. 16, 2021.
European Extended Search Report dated Jul. 15, 2025 in connection with Application No. 21957909.1.
Non-Final Office Action dated May 28, 2025, for U.S. Appl. No. 17/774,188.
Notice of Allowance dated Sep. 30, 2025, for U.S. Appl. No. 17/774,188.

* cited by examiner

| BIT VALUE (subCarrierSpacingCommon) | BIT VALUE (MSB of controlResourceSetZero) | $N_{SSB}^{QCL}$ | DBTW |
|---|---|---|---|
| 0 | 0 | 16 | ENABLED |
| 0 | 1 | 32 | ENABLED |
| 1 | 0 | 48 | ENABLED |
| 1 | 1 | 64 | DISABLED |

FIG. 7

| BIT VALUE (0) | [W₀, W₁, W₂, ..., W₂₃] |
|---|---|
| 0 | [0, 0, 0, ..., 0] |
| 1 | [1, 1, 1, ..., 1] |

FIG. 9

SYSTEMS, METHODS, AND DEVICES FOR INITIAL ACCESS SIGNALING IN A WIRELESS COMMUNICATION NETWORK

This application is a National Phase entry application of International Patent Application No. PCT/CN2021/120223 filed Sep. 24, 2021, entitled "SYSTEMS, METHODS, AND DEVICES FOR INITIAL ACCESS SIGNALING IN A WIRELESS COMMUNICATION NETWORK", the contents of which are herein incorporated by reference in their entirety.

FIELD

This disclosure relates to wireless communication networks including techniques for managing systems and devices of wireless communication networks.

BACKGROUND

Wireless communication networks may include user equipment (UEs) (e.g., smartphones, tablet computers, etc.) capable of communicating with base stations and other network nodes. Aspects of wireless communication networks include the manner, conditions, scenarios, and procedures by which wireless devices connect and otherwise communicate with one another. This may involve issues relating to how wireless devices may initially become aware of, and synchronize, one another in preparation for additional communications, such as access procedures, establishing connections, etc.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 7 is a diagram of an example of a table for jointly signaling whether a DBTW is enabled or disabled and an $N_{SSB}^{QCL}$ parameter.

FIG. 9 is a diagram of an example of a table for indicating a licensed band or an unlicensed band based on a scrambling sequence.

DETAILED DESCRIPTION

Figure 1:
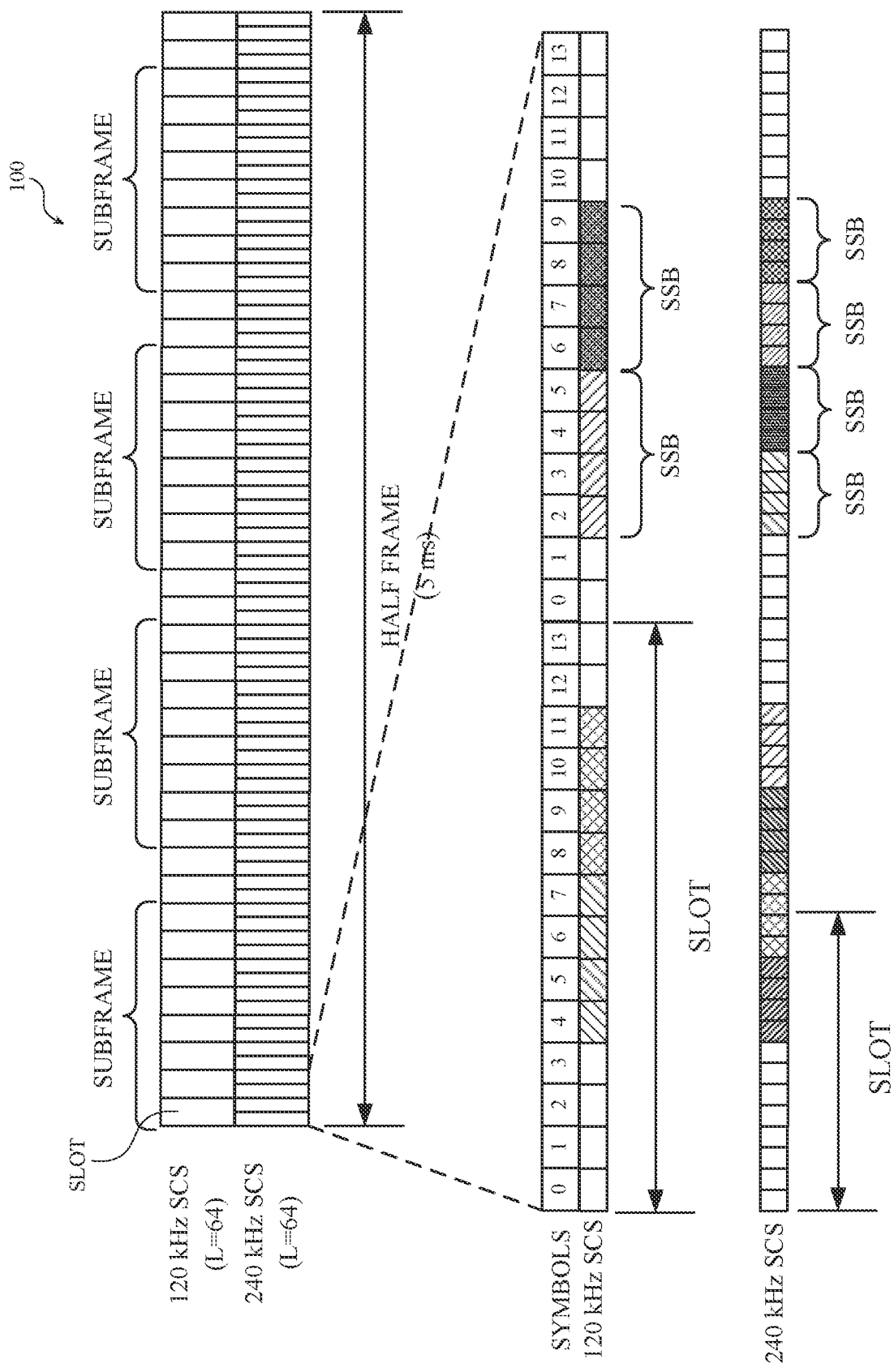
FIG. 1 is a diagram of an example of a frame, slot, and symbol structure with synchronization signal block (SSB) positions for 120 kilohertz (kHz) subcarrier spacing (SCS) and 240 kHz SCS.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless communication networks may include user equipment (UEs) capable of communicating wirelessly with base stations and other network nodes. These devices and communications may implement different types of radio access technologies (RATs), which may involve fourth generation (4G) or Long-Term Evolution (LTE) technology, fifth generation (5G) or new radio (NR) technology, sixth generation (6G) technology, and so on, of the 3rd Generation Partnership Project (3GPP). A fundamental aspect of implementing such technologies may include initial access signaling and signal synchronization.

Signal synchronization may include a process by which UEs obtain a time and frequency for communicating with, and accessing, a wireless network. There may include two types of synchronization: one for downlink (DL) synchronization and another for uplink (UL) synchronization. For DL synchronization, the UE may detect a frame boundary and a symbol boundary based on a synchronization signal block (SSB) from the network. The SSB may include a primary synchronization signal (PSS), a secondary synchronization signal (SSS), and a physical broadcast channel (PBCH), which may be used for signal synchronization. For uplink synchronization, the UE may determine appropriate time periods for transmitting data. Because a base station may be communicating with multiple UEs simultaneously, the network may be configured to ensure that UL signals arrive at the network at appropriate times for random access channel (RACH) procedures and other information changes.

In 5G, signals may be organized into frames that each consist of 10 milliseconds (ms). A frame may include 10 subframes at 1 ms each, and each subframe may include a number of slots that may depend on subcarrier spacing (SCS). For example, a subframe may include 8 slots of 120 kilohertz (kHz) subcarrier spacing (SCS), 16 slots of 240 kHz SCS, etc. Each slot may include 14 orthogonal frequency-division multiplexing (OFDM) symbols indexed from 0-13. A synchronization signal (SS) burst, or SSB burst, may include multiple SSBs, and each SSB may span 4 OFDM symbols with 1 symbol for the PSS, 1 symbol for the SSS, and 2 symbols for the PBCH. SSBs may be grouped into a first 5 ms of an SSB burst.

Figure 2:
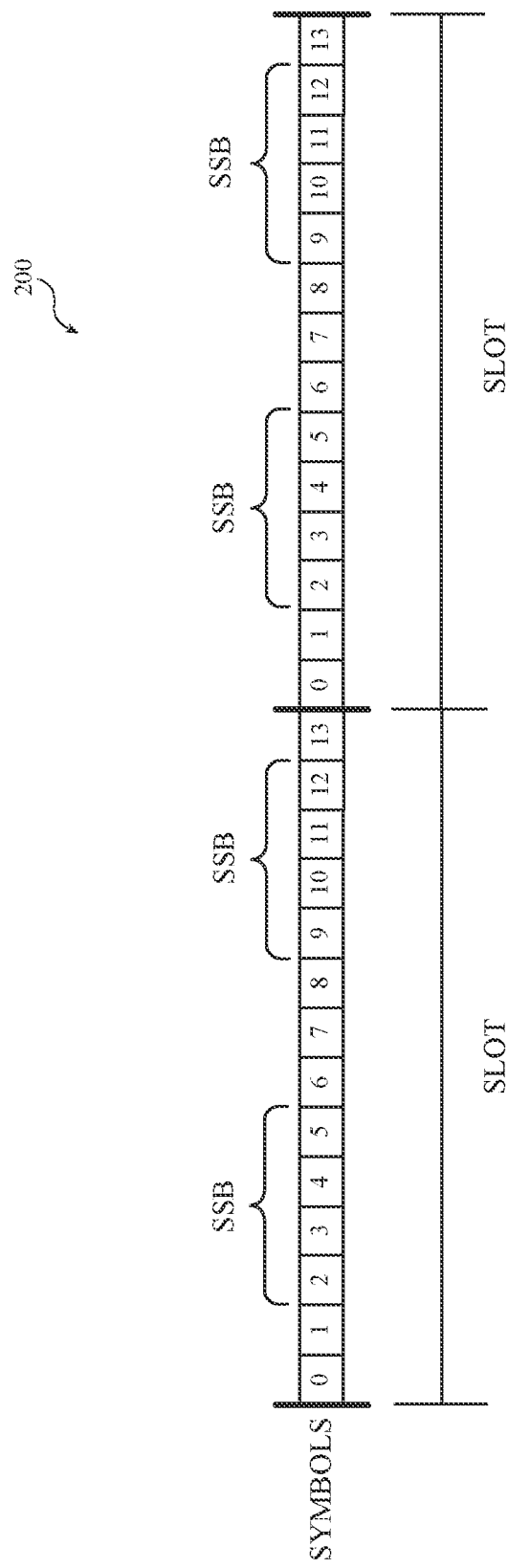
FIG. 2 is a diagram of an example of a frame, slot, symbol structure with SSB positions for 480 kHz SCS and 960 kHz SCS.

FIG. 1 is a diagram of an example 100 of a frame, slot, and symbol structure with candidate SSB positions for 120 kHz SCS and 240 kHz SCS. An SSB burst may include a maximum (L) of 64 SSBs per half frame. In a 120 kHz SCS scenario, a starting symbol position of each may include [4, 8, 16, 20]+28n, where n=0, 1, 2, 3, 5, 6, 7, 8, 10, 11, 12, 13, 15, 16, 17, and 18. In a 240 kHz SCS scenario, a starting symbol position of each SSB may include [8, 12, 16, 20, 32, 36, 40, 44]+56n, where n=0, 1, 2, 3, 5, 6, 7, and 8. FIG. 2 is a diagram of an example 200 of a frame, slot, symbol structure with SSB starting positions for 480 kHz SCS and 960 kHz SCS. A first symbol of candidate SSBs for 480 kHz SCS and 960 kHz SCS may have a symbol index of [2, 9]+14n (where index 0 corresponds to the first symbol of the first slot in a half frame). As above in FIG. 1, at 480 kHz SCS and 960 kHz SCS, an SSB burst may include a maximum of 64 SSBs in a half frame.

While in some frequency bands, such as 5 or 6 GHz bands, there are restrictions on the number of control transmissions, in higher frequency bands, such as 52.6 GHz frequency band or above, there is not a limitation on the number of control transmissions but a limitation on the total duration of the control transmissions within an observation period. For example, a margin of up to 10% control frame transmissions in these frequency bands, without performing listen-before-talk (LBT), is allowed or acceptable within an observation period of 100 ms. And while, for example, 480 kHz SCS and 960 kHz SCS may satisfy this 10% standard (assuming 64 SSBs and 20 ms periodicity) in higher frequency bands, 120 kHz SCS may not satisfy this standard due to, for example, the larger portion of symbols per slot allocated to the 64 SSBs. In other words, broadcasting 64 SSBs per SSB burst at 120 kHz SCS may cause control frame transmissions to be overly encumbered because of the 64 SSBs. Further, since a 10% control frame transmissions standard may apply to scenarios involving LBT requirements, and since some wireless communication networks (e.g., networks of some countries) may always require LBT, addressing whether and how LBT applies to a particular wireless communication network is a desirable feature for satisfying this 10% transmissions encumbrance standard.

Techniques described herein may enable base stations and UEs to implement initial access related signaling, which may vary the number of SSBs transmitted by the base station, to better ensure that control frame transmissions (e.g., 120 kHz SCS transmissions) are not overly encumbered by too many SSBs. These techniques include a variety of ways in which a base station may indicate whether a discovery burst transmission window (DBTW) is enabled or disabled for one or more SCSs, whether LBT is enabled or disabled, whether a transmission applies to a licensed band or an unlicensed band, a number of SSBs per DBTW, and/or which SSBs/SSB groups are actually active (e.g., actually transmitted) per discovery burst (DB). As described below with reference to the Figures, the base station may indicate this information implicitly or explicitly based on, for example, one or two bits of an existing information elements (IEs) (e.g., a subCarrierSpacingCommon IE, controlResourceSetZero IE, etc.), a parameter (e.g., a $N_{SSB}^{QCL}$ parameter, where N is a number of SSBs associated with a quasi co location (QCL)), and/or a bitmap corresponding to one or more existing fields (e.g., a groupPresence field, a inOneGroup field, etc.) of a master information block (MIB) or system information block (SIB).

A DBTW may include a duration and manner per which a base station may transmit a DB (e.g., a duration within which a UE may anticipate a base station transmitting a DB). A DB may include a DL transmission burst including one or more signals and/or channels confined within a window and associated with a communication cycle (also referred to as a duty cycle). A DB may include any combination of: 1) one or more transmissions communicated by a base station that includes a PSS, SSS, cell-specific reference signals (CRS) and may include non-zero power channel state information (CSI) reference signals (CSI-RS); and 2) one or more transmissions communicated by a base station that includes a SS/PBCH block consisting of a PSS, SSS, PBCH, demodulated reference signal (DM-RS). The transmissions may also include a control resource set (CORESET) for physical DL control channel (PDCCH) scheduling a physical download shared channel (PDSCH) with system information block 1 (SIB1), and a PDSCH carrying SIB1 and/or a non-zero power CSI reference signals (CSI-RS).

Figure 3:
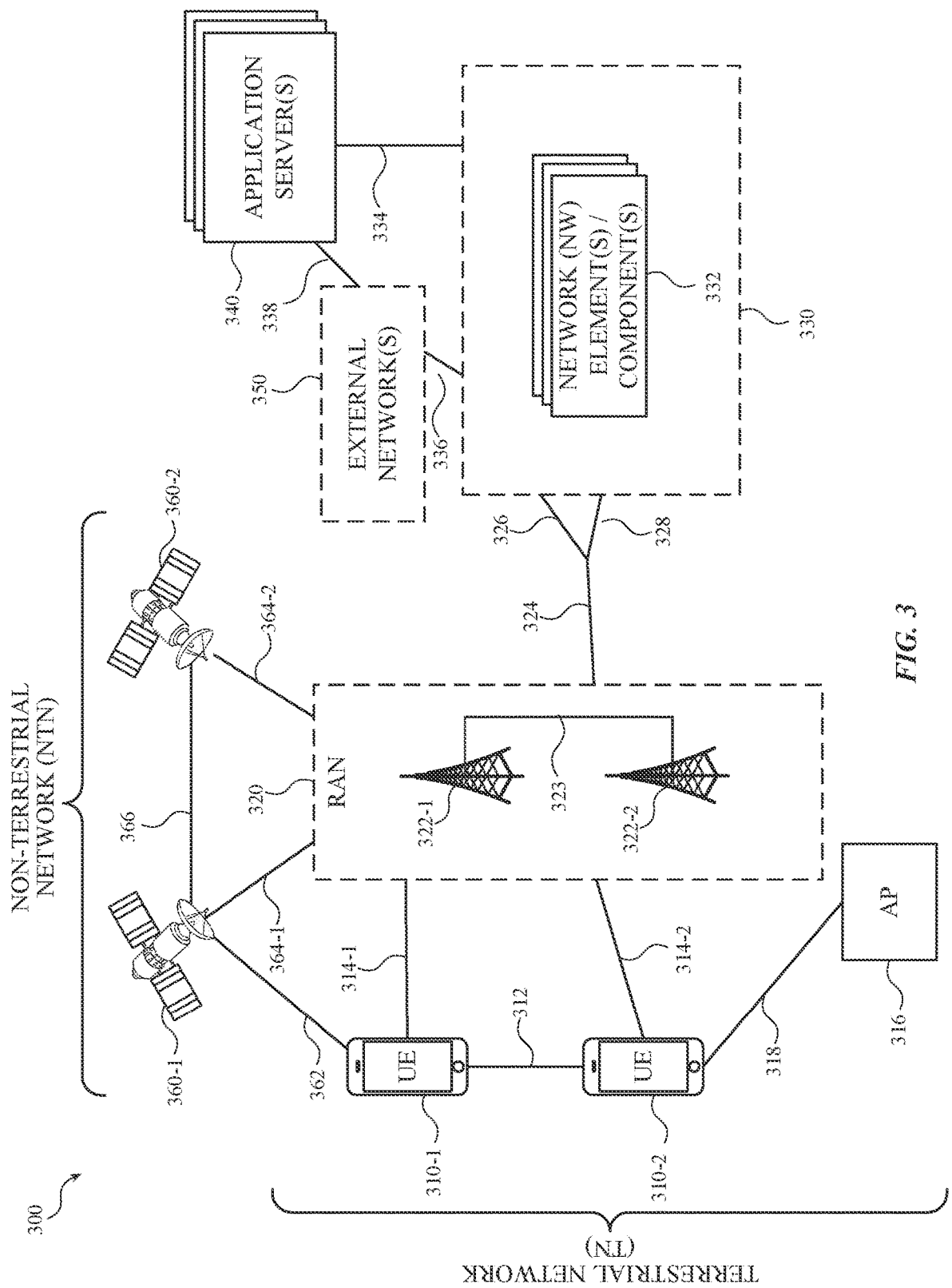
FIG. 3 is a diagram of an example network according to one or more implementations described herein.

FIG. 3 is an example network 300 according to one or more implementations described herein. Example network 300 may include UEs 310-1, 310-2, etc. (referred to collectively as "UEs 310" and individually as "UE 310"), a radio access network (RAN) 320, a core network (CN) 330, application servers 340, external networks 350, and satellites 360-1, 360-2, etc. (referred to collectively as "satellites 360" and individually as "satellite 360"). As shown, network 300 may include a non-terrestrial network (NTN) comprising one or more satellites 360 (e.g., of a global navigation satellite system (GNSS)) in communication with UEs 310 and RAN 320.

The systems and devices of example network 300 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 300 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 310 may include smartphones (e.g., handheld touchscreen mobile computing devices connectable to one or more wireless communication networks). Additionally, or alternatively, UEs 310 may include other types of mobile or non-mobile computing devices capable of wireless communications, such as personal data assistants (PDAs), pagers, laptop computers, desktop computers, wireless handsets, etc. In some implementations, UEs 310 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 310 may communicate and establish a connection with (e.g., be communicatively coupled) with RAN 320, which may involve one or more wireless channels 314-1 and 314-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 322-1 and 322-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 330. Additionally, at least one of the MN or the SN may be operated with shared spectrum channel access, and functions specified for UE 310 can be used for an integrated access and backhaul mobile termination (IAB-MT). Similar for UE 301, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 322.

As shown, UE 310 may also, or alternatively, connect to access point (AP) 316 via connection interface 318, which may include an air interface enabling UE 310 to communicatively couple with AP 316. AP 316 may comprise a wireless local area network (WLAN), WLAN node, WLAN termination point, etc. The connection 318 may comprise a local wireless connection, such as a connection consistent with any IEEE 702.11 protocol, and AP 316 may comprise a wireless fidelity (Wi-Fi®) router or other AP. While not explicitly depicted in FIG. 3, AP 316 may be connected to another network (e.g., the Internet) without connecting to RAN 320 or CN 330. In some scenarios, UE 310, RAN 320, and AP 316 may be configured to utilize LTE-WLAN aggregation (LWA) techniques or LTE WLAN radio level integration with IPsec tunnel (LWIP) techniques. LWA may involve UE 310 in RRC_CONNECTED being configured by RAN 320 to utilize radio resources of LTE and WLAN. LWIP may involve UE 310 using WLAN radio resources (e.g., connection interface 318) via IPsec protocol tunneling to authenticate and encrypt packets (e.g., Internet Protocol (IP) packets) communicated via connection interface 318. IPsec tunneling may include encapsulating the entirety of original IP packets and adding a new packet header, thereby protecting the original header of the IP packets.

RAN 320 may include one or more RAN nodes 322-1 and 322-2 (referred to collectively as RAN nodes 322, and individually as RAN node 322) that enable channels 314-1 and 314-2 to be established between UEs 310 and RAN 320. RAN nodes 322 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 322 may include a roadside unit (RSU), a transmission reception point (TRxP or TRP), and one or more other types of ground stations (e.g., terrestrial access points). In some scenarios, RAN node 322 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 360 may operate as base stations (e.g., RAN nodes 322) with respect to UEs 310. As such, references herein to a base station, RAN node 322, etc., may involve implementations where the base station, RAN node 322, etc., is a terrestrial network node and also to implementation where the base station, RAN node 322, etc., is a non-terrestrial network node (e.g., satellite 360).

Some or all of RAN nodes 322 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 322; a media access control (MAC)/physical (PHY) layer split wherein RRC, PDCP, radio link control (RLC), and MAC layers may be operated by the CRAN/vBBUP and the PHY layer may be operated by individual RAN nodes 322; or a "lower PHY" split wherein RRC, PDCP, RLC, MAC layers and upper portions of the PHY layer may be operated by the CRAN/vBBUP and lower portions of the PHY layer may be operated by individual RAN nodes 322. This virtualized framework may allow freed-up processor cores of RAN nodes 322 to perform or execute other virtualized applications.

In some implementations, an individual RAN node 322 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 320 or by a server pool (e.g., a group of servers configured to share resources) in a similar manner as the CRAN/vBBUP. Additionally, or alternatively, one or more of RAN nodes 322 may be next generation eNBs (i.e., gNBs) that may provide evolved universal terrestrial radio access (E-UTRA) user plane and control plane protocol terminations toward UEs 310, and that may be connected to a 5G core network (5GC) 330 via an NG interface.

Any of the RAN nodes 322 may terminate an air interface protocol and may be the first point of contact for UEs 310. In some implementations, any of the RAN nodes 322 may fulfill various logical functions for the RAN 320 including, but not limited to, radio network controller (RNC) functions such as radio bearer management, uplink and downlink dynamic radio resource management and data packet scheduling, and mobility management. UEs 310 may be configured to communicate using orthogonal frequency-division multiplexing (OFDM) communication signals with each other or with any of the RAN nodes 322 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 322 to UEs 310, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 322 may be configured to wirelessly communicate with UEs 310, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. In some implementations, (e.g., 5G NR implementations) a first frequency range (FR1) may include bands from a frequency spectrum of 410 MHz to 7125 MHz, while a second frequency range (FR2) may include bands from 24.25 GHz to 52.6 GHz. The 5 GHz band, 6 GHz band, and bands above 52.6 GHz (e.g., 60 GHz band may correspond to an unlicensed spectrum although different configurations of bands may correspond to a licensed or unlicensed spectrum.

A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 310 and the RAN nodes 322 may operate using licensed assisted access (LAA), eLAA, feLAA, stand-alone unlicensed, and/or NR-U mechanisms. In these implementations, UEs 310 and the RAN nodes 322 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 310 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 310. The physical downlink control channel (PDCCH) may carry information about the transport format and resource allocations related to the PDSCH channel, among other things. The PDCCH may also inform UEs 310 about the transport format, resource allocation, and hybrid automatic repeat request (HARQ) information related to the uplink shared channel. Typically, downlink scheduling (e.g., assigning control and shared channel resource blocks to UE 310-2 within a cell) may be performed at any of the RAN nodes 322 based on channel quality information fed back from any of UEs 310. The downlink resource assignment information may be sent on the PDCCH used for (e.g., assigned to) each of UEs 310.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 322 may be configured to communicate with one another via interface 323. In implementations where the system is an LTE system, interface 323 may be an X2 interface. The X2 interface may be defined between two or more RAN nodes 322 (e.g., two or more eNBs/gNBs or a combination thereof) that connect to evolved packet core (EPC) or CN 330, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 310 from an SeNB for user data; information of PDCP PDUs that were not delivered to a UE 310; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality. In a 5G system, an interface between RAN nodes 322 may be Xn interface, and an interface between RAN node 322 and CN 330 may be an NG interface.

As shown, RAN 320 may be connected (e.g., communicatively coupled) to CN 330. CN 330 may comprise a plurality of network elements 332, which are configured to offer various data and telecommunications services to customers/subscribers (e.g., users of UEs 310) who are connected to the CN 330 via the RAN 320. In some implementations, CN 330 may include an evolved packet core (EPC), a 5G CN, and/or one or more additional or alternative types of CNs. The components of the CN 330 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 330 may be referred to as a network slice, and a logical instantiation of a portion of the CN 330 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 330, application servers 340, and external networks 350 may be connected to one another via interfaces 334, 336, and 338, which may include IP network interfaces. Application servers 340 may include one or more server devices or network elements (e.g., virtual network functions (VNFs) offering applications that use IP bearer resources with CM 330 (e.g., universal mobile telecommunications system packet services (UMTS PS) domain, LTE PS data services, etc.). Application servers 340 may also, or alternatively be configured to support one or more communication services (e.g., voice over IP (VoIP) sessions, push-to-talk (PTT) sessions, group communication sessions, social networking services, etc.) for UEs 310 via the CN 330. Similarly, external networks 350 may include one or more of a variety of networks, including the Internet, thereby providing the mobile communication network and UEs 310 of the network access to a variety of additional services, information, interconnectivity, and other network features.

As shown, example network 300 may include an NTN that may comprise one or more satellites 360-1 and 360-2 (collectively, "satellites 360"). Satellites 360 may be in communication with UEs 310 via service link or wireless interface 362 and/or RAN 320 via feeder links or wireless interfaces 364 (depicted individually as 364-1 and 364). In some implementations, satellite 360 may operate as a passive or transparent network relay node regarding communications between UE 310 and the terrestrial network (e.g., RAN 320). In some implementations, satellite 360 may operate as an active or regenerative network node such that satellite 360 may operate as a base station to UEs 310 (e.g., as a gNB of RAN 320) regarding communications between UE 310 and RAN 320. In some implementations, satellites 360 may communicate with one another via a direct wireless interface (e.g., 366) or an indirect wireless interface (e.g., via RAN 320 using interfaces 364-1 and 364-2).

Additionally, or alternatively, satellite 360 may include a GEO satellite, LEO satellite, or another type of satellite. Satellite 360 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 360 may operate as bases stations (e.g., RAN nodes 322) with respect to UEs 310. As such, references herein to a base station, RAN node 322, etc., may involve implementations where the base station, RAN node 322, etc., is a terrestrial network node and implementation, where the base station, RAN node 322, etc., is a non-terrestrial network node (e.g., satellite 360).

Figure 4:
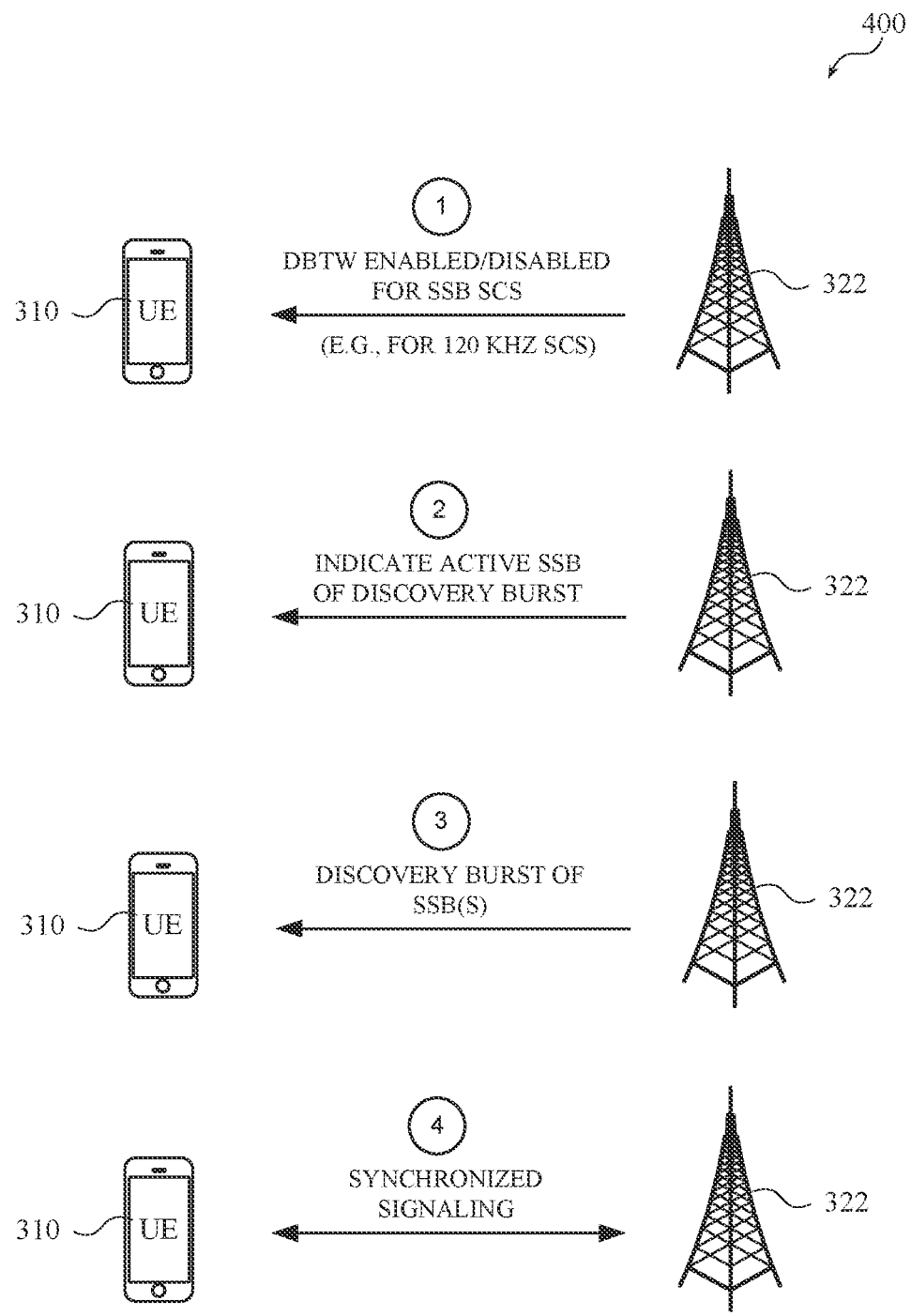
FIG. 4 is a diagram of an example overview of initial access signaling in a wireless communication network according to one or more implementations described herein.

FIG. 4 is a diagram of an example overview 400 of initial access signaling in a wireless communication network according to one or more implementations described herein. As shown, base station 322 may communicate an indication, to UE 310, of whether a DBTW is enabled or disabled for base station 322 (at 1). The DBTW may correspond to one or more SCS schemes, such as a 120 kHz SCS, 240 kHz SCS, 480 kHz SCS, and 960 kHz SCS. A DBTW may include a duration of time and/or manner in which UE 310 may anticipate receiving one or more SSBs of a discovery burst from base station 322.

Base station 322 may also provide UE 310 with an indication of which SSBs, or a plurality of SSB candidates, of the discovery burst are active (at 2). Candidate SSBs may include a maximum number of SSBs that base station 322 may transmit; active SSBs may include which SSBs base station 322 actually transmits. Base station 322 may transmit the discovery burst of SSBs to UE 310 (at 3). And UE 310 may use the SSBs to determine appropriate transmission timings for communicating with base station 322 and engage in synchronized signaling (at 4). The synchronized signaling may include receiving additional DL information from base station 322 and/or providing UL information, including performing an attachment procedure, establishing one or more connections, registering with the network, etc.

Figure 5:
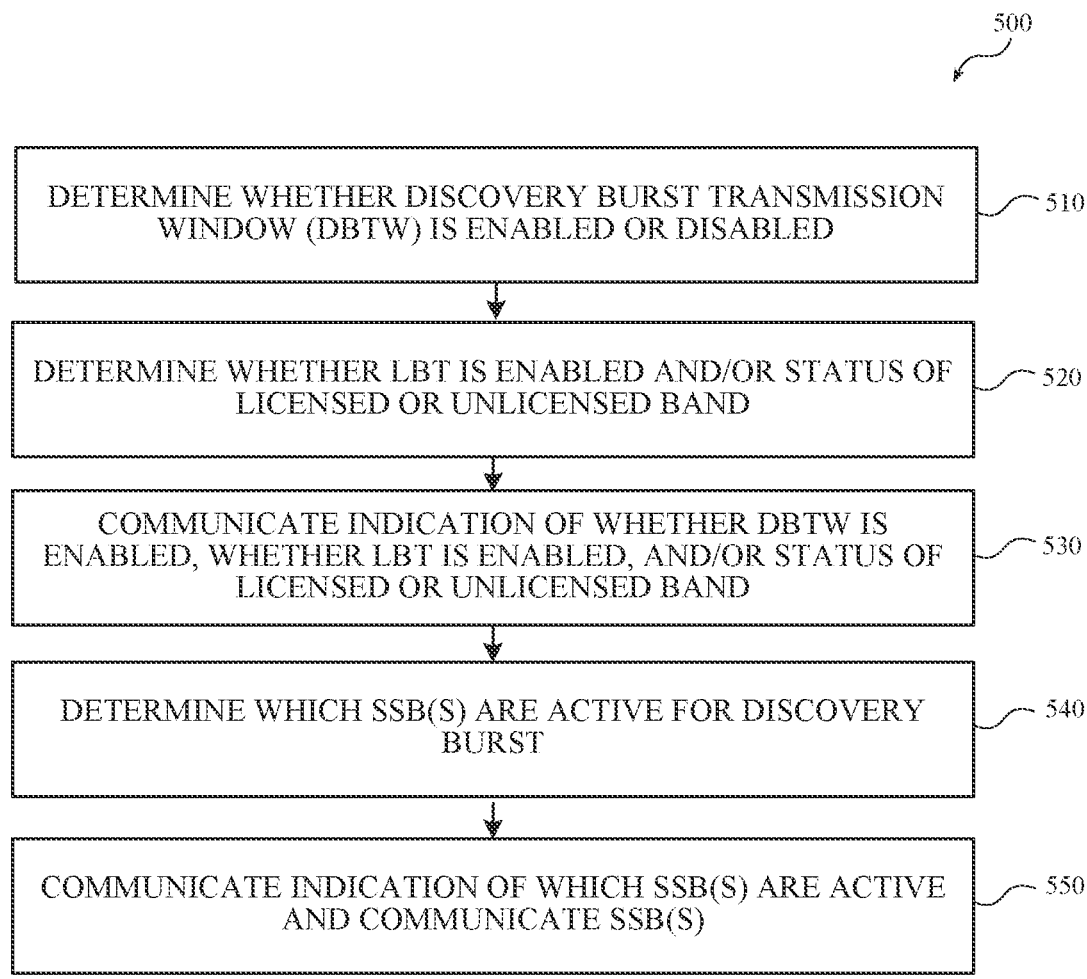
FIG. 5 is a diagram of an example of a process for initial access signaling in a wireless communication network.

FIG. 5 is a diagram of an example of a process 500 for initial access signaling in a wireless communication network. Process 500 may be implemented by base station 322. In some implementations, some or all of process 500 may be performed by one or more other systems or devices, including one or more of the devices of FIG. 3, such as UE 310. Additionally, process 500 may include one or more fewer, additional, differently ordered, and/or arranged operations than those shown in FIG. 5. In some implementations, some or all of the operations of process 500 may be performed independently, successively, simultaneously, etc., of one or more of the other operations of process 500. As such, the techniques described herein are not limited to a number, sequence, arrangement, timing, etc., of the operations depicted in FIG. 3. Additionally, while process 500 may be primarily described from the perspective a particular device (e.g., base station 322), the techniques described herein also include corresponding or complementary operations performed by a corresponding device (e.g., UE 310). Further, process 500 provides brief examples of operations that may be performed using the techniques described herein. Additional details of the operations presented in FIG. 5, as well as additional and alternative features and operations, are described further below with reference to the remaining Figures.

A shown, process 500 may include determining whether a DBTW is enabled or disabled (block 510). For example, base station 322 may determine whether a DBTW, for communicating SSBs to UEs 310, is enabled or disabled. In some implementations, base station 322 may determine whether a DBTW is enabled or disabled for one, more than one, or all SSB SCSs (e.g., a 120 kHz SCS, 240 kHz SCS, 480 kHz SCS, 960 kHz SCS, etc.). Base station 322 may also, or alternatively, determine whether a DB is enabled or disabled, whether the transmission of SSBs to UEs 310 is enabled or disabled, etc.

Process 500 may include determining whether LBT is enabled or disabled and/or a status of a licensed band and/or unlicensed band (block 520). For example, base station 322 may determine whether LBT is enabled or disabled for one, more than one, or all SSB SCSs. Additionally, or alternatively, base station 322 may determine a status of a licensed band and/or unlicensed corresponding to one, more than one, or all SSB CSCs. In some implementations, whether the DBTW is enabled/disabled may depend on whether LBT is enabled/disabled, and whether LBT is enabled/disabled may depend on a status of a licensed band, an unlicensed band, or a combination thereof. For example, some wireless communication networks (e.g., a network of a particular company, country, etc.) may require LBT for all communications regardless of whether the communication is via a licensed band and/or unlicensed band. By contrast, other wireless communication networks may only require, enable, etc., LBT for certain communications, which may be based on whether the communications involve a licensed band, an unlicensed band, or a combination thereof. Additionally, or alternatively, some wireless communication networks may enable or disable the DBTW based on whether LBT is enabled or disabled.

Process 500 may include communicating an indication of whether the DBTW is enabled or disabled, whether LBT is enabled or disabled, and/or a status of a licensed band and/or unlicensed band (block 530). For example, base station 322 may communicate, to UE 310, an indication of whether the DBTW is enabled or disabled, whether LBT is enabled or disabled, and/or a status of a licensed band and/or unlicensed band. As described herein, these types of information may be indicated implicitly (e.g., based on other information) or implicitly (e.g., based on a direct indication).

In some implementations, the indication of whether the DBTW is enabled or disabled may be transmitted via one or more IEs (e.g., in a subCarrierSpacingCommon IE, a ssb-SubcarrierOffset, or a controlResourceSetZero IE) and/or an MIB or SIB (e.g., SIB1). In some implementations, the indication of whether the DBTW is enabled or disabled may be jointly signaled with another type of information, such as a value of a $N_{SSB}^{QCL}$ parameter. For example, base station 322 may indicate whether the DBTW is enabled or disabled using one or more IEs, and UE 310 may determine a value of the $N_{SSB}^{QCL}$ parameter based on the IEs. In some implementations, an indication of whether LBT is enabled or disabled may be transmitted via an MIB or SIB (e.g., SIB1) or implicitly derived by UE 310 based on the value of the $N_{SSB}^{QCL}$ parameter and a maximum number of candidate SSBs $MAX_{SSB}$ (e.g., 64). For example, if the value of the $N_{SSB}^{QCL}$ parameter is less than a $MAX_{SSB}$ parameter, UE 310 may determine that LBT is enabled. Alternatively, if the $N_{SSB}^{QCL}$ parameter is greater than or equal to a $MAX_{SSB}$ parameter, UE 310 may determine that LBT is disabled.

In some implementations, the indication of whether the status of the licensed band and/or unlicensed band may be indicated via a MIB, a SIB (e.g., SIB1), and/or a scrambling sequence used to scramble cyclic redundancy check (CRC) bits of a public broadcast channel (PBCH). A size of download control information (DCI) (e.g., DCI format 10) in a common search space (CSS) may be aligned between licensed and unlicensed operation to avoid increasing number of DB attempts for UE 310. In some implementations, the DCI format 1_0 CSS defined for unlicensed band communications may be repurposed as the DCI format 1_0 CCS for both the licensed band and the unlicensed band for frequency range 2-2 (FR2-2) transmissions.

Process 500 may also include determining which SSBs are active for the discovery burst (block 540). For example, base station 322 may determine which SSBs, of a maximum number of SSBs (e.g., candidate SSBs), may actually be transmitted to UE 310. In some implementations, the active SSBs may be based on the SCS and/or the value of the $N_{SSB}^{QCL}$ parameter. The number of active SSBs may be any one of 16, 32, 48, and/or 64. For instance, 16 or 32 SSBs may be active for a 120 kHz SCS, whereas any of 16, 32, 48, or 64 SSBS may be active for a 240 kHz SCS, a 480 kHz SCS, or a 960 kHz SCS. In this manner, techniques described herein may be used to better ensure that control frame transmissions (e.g., 120 kHz SCS transmissions) are not overly encumbered by too many SSBs of a discovery burst.

Process 500 may include communicating an indication of which SSBs are active and communicating the SSBs (block 550). For example, base station 322 may transmit, to UEs 310, information indicating which SSBs are active. In some implementations, base station 322 may indicate which SSBs are active via an IE or field (e.g., a ssb-PositionsInBurst IE, a groupPresence field, an inOneGroup field, etc.), which may indicate a combination of which SSB groups are active and which SSBs in each group are active. In some implementations, base station 322 may indicate which SSBs are active by applying a most significant bits (MSB) approach to a bit map based on the value of the $N_{SSB}^{QCL}$ parameter.

Figure 6:
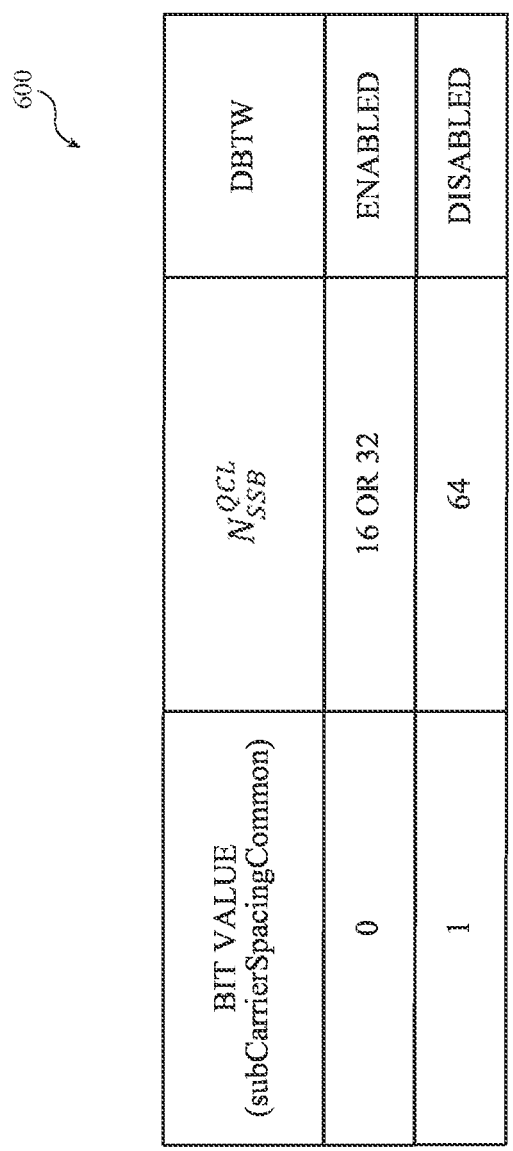
FIG. 6 is a diagram of an example of a table for jointly signaling whether a DBTW is enabled or disabled and an $N_{SSB}^{QCL}$ parameter.

FIG. 6 is a diagram of an example of a table 600 for jointly signaling whether a DBTW is enabled or disabled and a value for an $N_{SSB}^{QCL}$ parameter. As shown, a one-bit indication for jointly signaling whether the DBTW is enabled and the value of the $N_{SSB}^{QCL}$ parameter. Base station 322 may use a single bit of, for example, the subCarrierSpacingCommon IE, from the MIB payload, for this indication. A value of "1" may indicate that the DBTW is enabled, and based on the "1", UE 310 may determine that the value of the $N_{SSB}^{QCL}$ parameter is 16 or 32 (e.g., depending on the implementation or one of 16 or 32 that is pre-defined in specification). A value of "0" may indicate that the DBTW is disabled, and based on the "0", UE 310 may determine that the value of the $N_{SSB}^{QCL}$ parameter is 64 (e.g., a maximum value for the $N_{SSB}^{QCL}$ parameter). As such, DBTW and the $N_{SSB}^{QCL}$ parameter may be signaled jointly, by DBTW being signaled explicitly and the value of the $N_{SSB}^{QCL}$ parameter being signaled implicitly or vice versa.

FIG. 7 is a diagram of an example of a table 700 for jointly signaling whether a discovery burst transmission window (DBTW) is enabled or disabled and an $N_{SSB}^{QCL}$ parameter. As shown, a two-bit indication may be used to jointly signal whether the DBTW is enabled and the value of the $N_{SSB}^{QCL}$ parameter. Base station 322 may use a single bit of, for example, the subCarrierSpacingCommon IE and a single bit (e.g., an MSB) of the controlResourceSetZero IE, which may correspond to the pdcch-ConfigSIB1 IE of the MIB.

A value of "0" from the subCarrierSpacingCommon IE and a value of "0" from the controlResourceSetZero IE may indicate that the DBTW is enabled and the value of the $N_{SSB}^{QCL}$ parameter is 16. A value of "0" from the subCarrierSpacingCommon IE and a value of "1" from the controlResourceSetZero IE may indicate that the DBTW is enabled and the value of the $N_{SSB}^{QCL}$ parameter is 32. A value of "1" from the subCarrierSpacingCommon IE and a value of "0" from the controlResourceSetZero IE may indicate that the DBTW is enabled and the value of the $N_{SSB}^{QCL}$ parameter is 32. And a value of "1" from the subCarrierSpacingCommon IE and a value of "1" from the controlResourceSetZero IE may indicate that the DBTW is disabled and the value of the $N_{SSB}^{QCL}$ parameter is 64 (e.g., a maximum number of SSBs that can be active in a half frame).

As such, the status of the DBTW and the value of the $N_{SSB}^{QCL}$ parameter may be signaled jointly using a two-bit indicator. In some implementations, base station 322 may also, or alternatively use a single bit of the subCarrierSpacingCommon IE, and either a single bit (e.g., the least significant bit (LSB)) from a ssb-SubcarrierOffset IE or a reserved bit of the MIB payload, for the two-bit indication. In some implementations, the value of the $N_{SSB}^{QCL}$ parameter may be 8, 16, 32, 64, respectively, instead of 16, 32, 48, and 64 as shown in FIG. 7.

Figure 8:
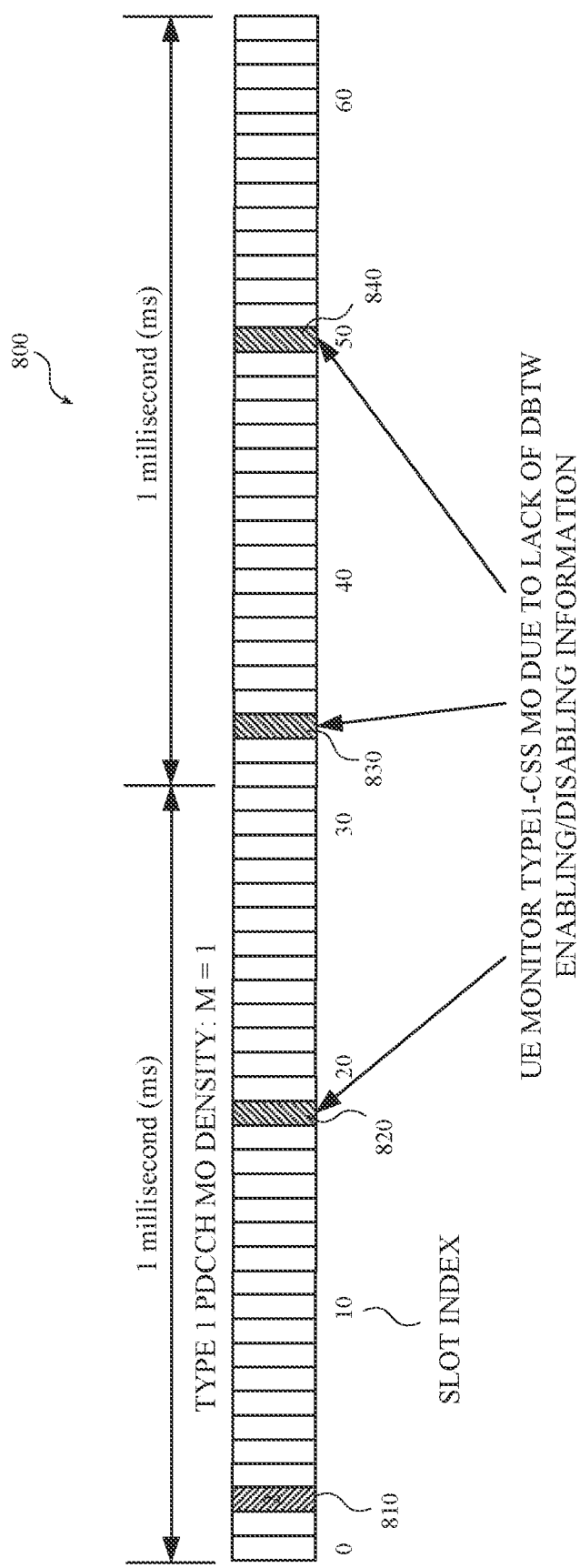
FIG. 8 is a diagram of an example of monitoring occasions (MOs) based on whether an indication is provided about whether a DBTW is enabled or disabled.

FIG. 8 is a diagram of an example 800 of monitoring occasions (MOs) based on whether an indication is provided about whether a DBTW is enabled or disabled. In some implementations, whether the DBTW is enabled or disabled may be explicitly indicated in an SIB, such as SIB1. Additional information may be provided in the SIB for transmissions corresponding to frequency range 2-2 (FR2-2). For example, the value of the $N_{SSB}^{QCL}$ parameter may also, or alternatively, be provided in the SIB. In some implementations, an SIB may be used to indicate the value of the $N_{SSB}^{QCL}$ parameter when there is no available bit in the MIB payload, when a larger number of $N_{SSB}^{QCL}$ parameter values are available or introduced than can be accommodated by the MIB payload, etc.

In some implementations, four values of the $N_{SSB}^{QCL}$ parameter (e.g., 16, 32, 48, and 64) may be predefined by a communication standard (e.g., the 3rd generation partnership project (3GPP) standard) when, for example, the MIB payload does not have two bits to indicate both the DBTW and the $N_{SSB}^{QCL}$ parameter. In such implementations, UE 310 may assume that DBTW is enabled. UE 310 may also use the smallest value in the predefined set for the $N_{SSB}^{QCL}$ parameter (e.g., 16) for Type0-PDCCH monitoring to acquire the SIB. For example, as shown in FIG. 8, example 800 may be provided with the assumptions that the system is operating in a licensed band, with DBTW disabled, and the $N_{SSB}^{QCL}$ parameter being predefined as one of 16, 32, 48, and 64. In such a scenario, UE 310 may assume the value of the $N_{SSB}^{QCL}$ parameter is 16 (e.g., the smallest value in the predefined set) for Type0-PDCCH monitoring and therefore only monitor the MO of slot 2 (at 810) for the SIB instead of additional MOs as well (at 820, 830, and 840). Type0-PDCCH monitoring may include monitoring a common search space, which may be a subset of NR PDCCH search space for transmitting the PDCCH for SIBs, such as SIB1.

Base station 322 may also, or alternatively, use the SIB to provide an explicit indication of whether LBT is enabled or disabled. In other implementations, base station 322 may implicitly indicate to UE 310 whether LBT is enabled or disabled, such that UE 310 may derive the status of LBT based on other information. In some implementations, UE 310 may derive whether LBT is enabled/disabled based on the $N_{SSB}^{QCL}$ parameter and a $MAX_{SSB}$ parameter. The $MAX_{SSB}$ parameter may indicate a maximum number of SSBs that may be transmitted in a discovery burst which may differ from the number of SSBs actually transmitted. For example, if the $N_{SSB}^{QCL}$ parameter is less than a $MAX_{SSB}$ parameter (e.g., 64), UE 310 may determine that LBT is enabled. Alternatively, if the $N_{SSB}^{QCL}$ parameter is greater than or equal to a $MAX_{SSB}$ parameter (e.g., 64), UE 310 may determine that LBT is disabled.

Base station 322 may also, or alternatively, use an SIB to provide an indication of a licensed band or unlicensed band. In other implementations, base station 322 may use the MIB to provide an indication of a licensed band or unlicensed band. For example, a reserved bit of the MIB, a bit the subCarrierSpacingCommon IE, etc., may be used. In other implementations, a scrambling sequence may be used to indicate a licensed band or unlicensed band.

Figure 9:
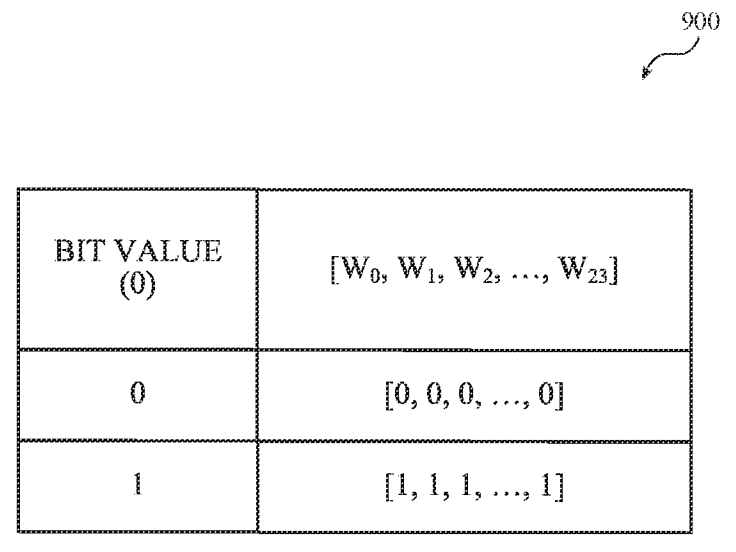

FIG. 9 is a diagram of an example of a table 900 for indicating a licensed band or an unlicensed band based on a scrambling sequence. As shown, a value of a bit (e.g., b(0)) may be mapped to one of two scrambling sequences (e.g., $[W_0, W_1, W_2, \ldots, W_{23}]$). The possible values of the bit (0 and 1) may indicate (e.g., be predefined to indicate) a licensed band or unlicensed band, respectively. As such, base station 322 may select one of the scrambling sequences and use the selected scrambling sequence to scramble CRC bits of a PBCH. Additionally, UE 310 may determine which scrambling sequence has been used and determine whether a licensed band or an unlicensed band is applicable or indicated. As such, in addition to an MIB or SIB, a scrambling sequence may be used to indicate a licensed band or unlicensed band.

Figure 10:
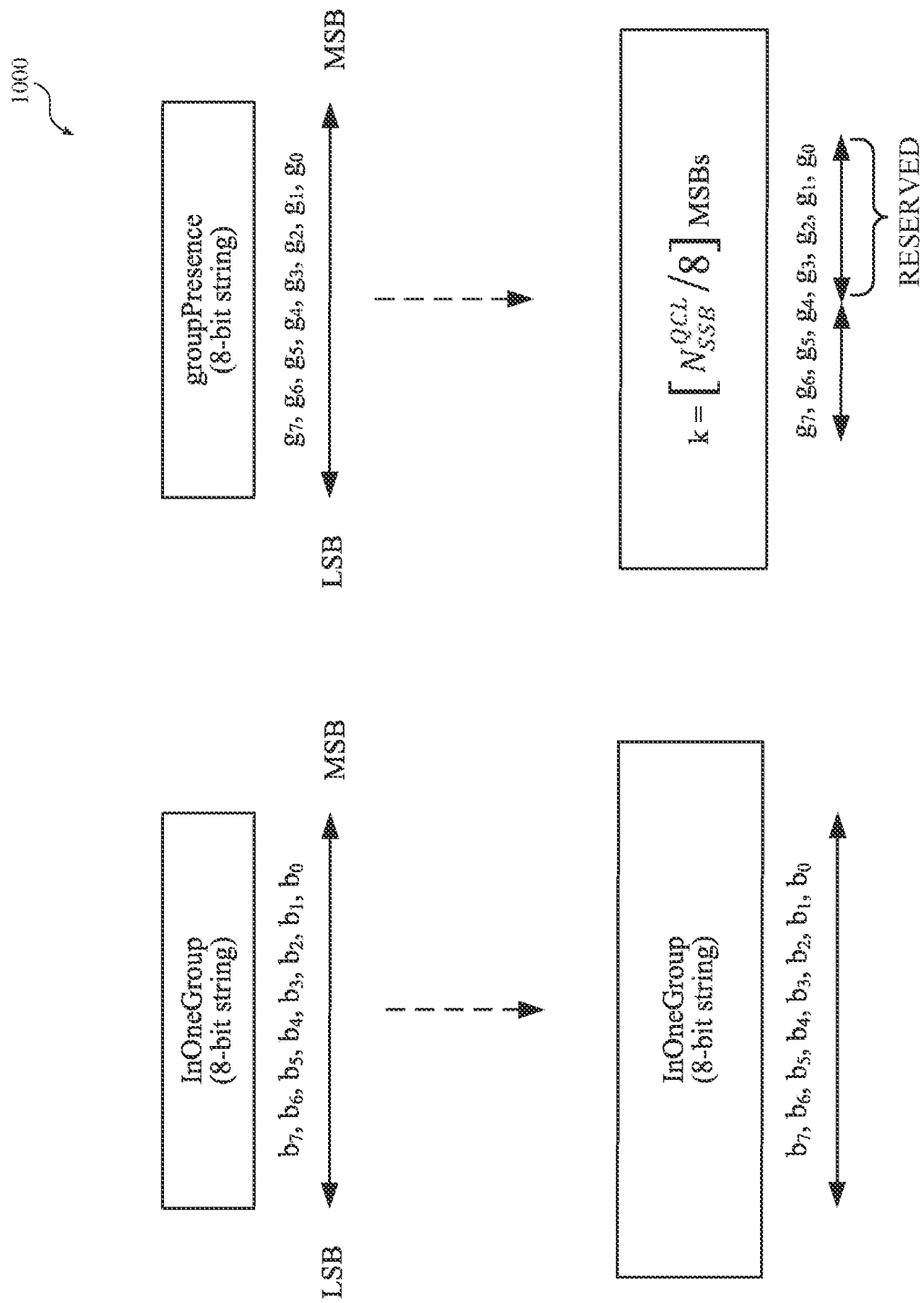
FIGS. 10-12 are diagrams of examples for indicating active SSBs and/or active SSB groups of a DBTW.
Figure 11:
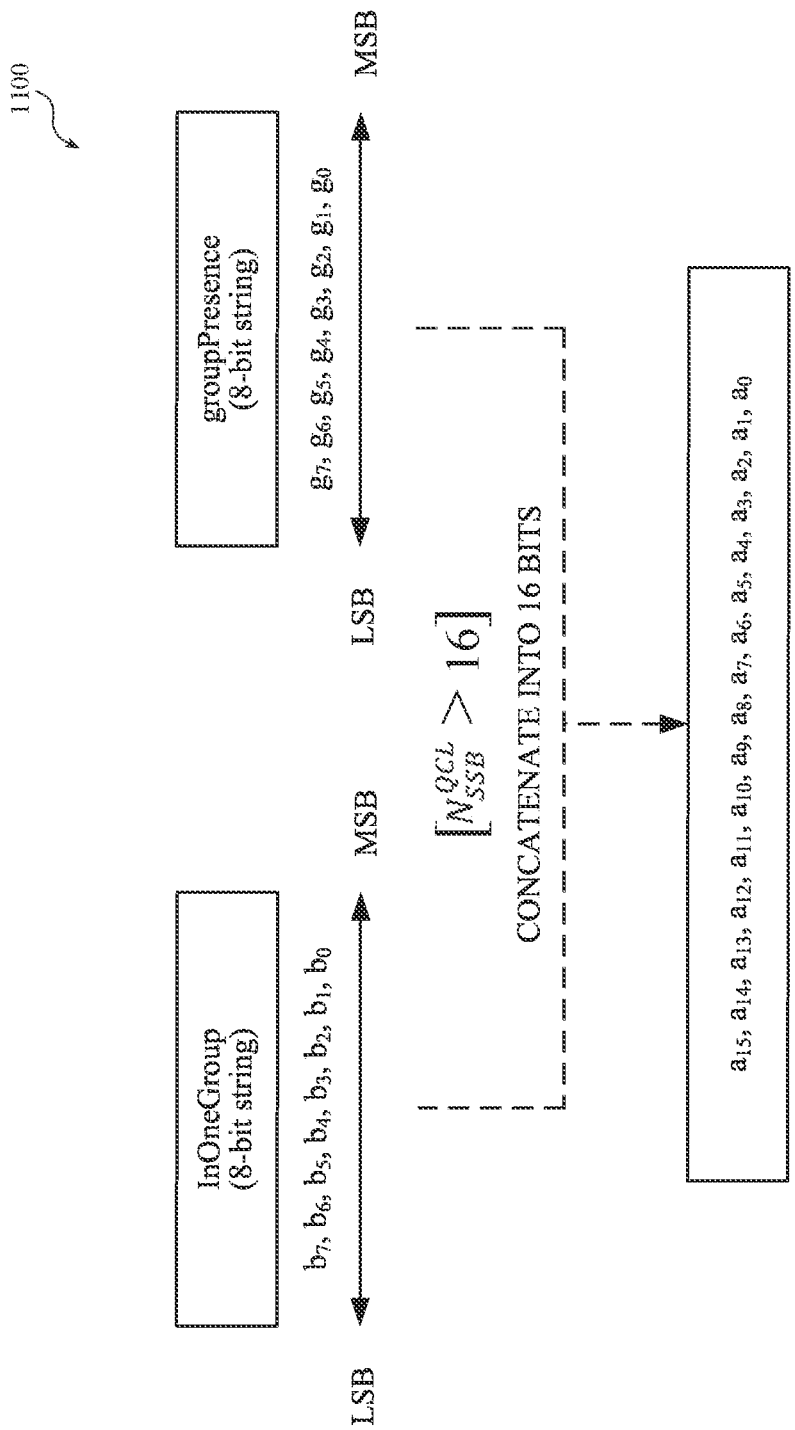
Figure 12:
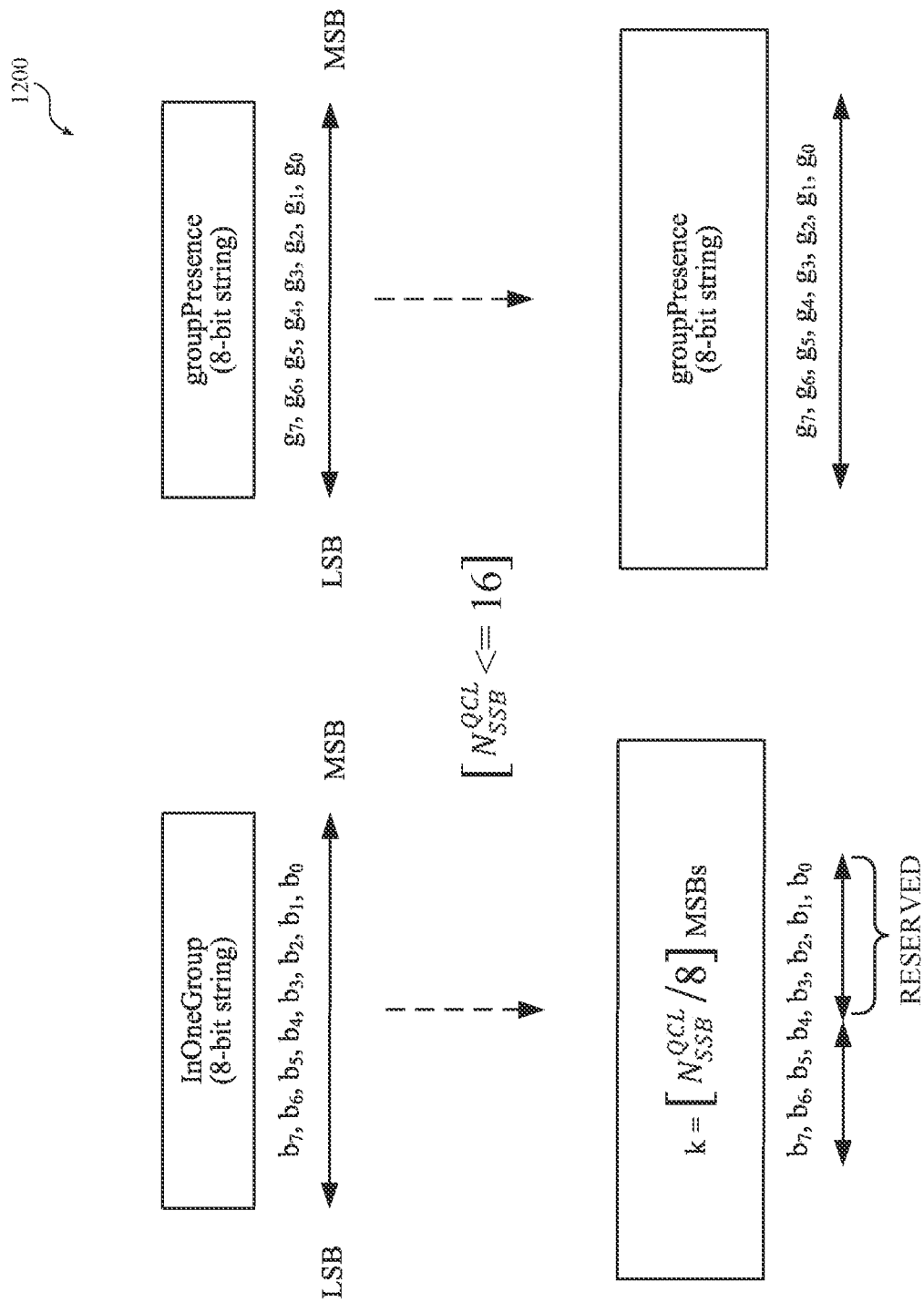

FIGS. 10-12 are diagrams of examples 1000, 1100, and 1200 for indicating active SSBs and/or active SSB groups of a DBTW. As shown, examples 1000, 1100, and 1200 may each include an inOneGroup field and a groupPresence field. Each field may include 8 bits ($b_7, b_6, b_5, b_4, b_3, b_2, b_1, b_0$ and $g_7, g_6, g_5, g_4, g_3, g_2, g_1, g_0$) ranging from a LSB to an MSB.

As described herein, base station 322 may use SIB1 to broadcast information about SSB transmissions within an SSB burst. For example, for frequency range 2-1 (FR 2-1), 64 SSBs may be divided into 8 groups and 8 SSBs per group. SIB1 may include an inOneGroup field that may include a bit string indicating which SSB, within a group of SSBs, are actually transmitted (or active). SIB1 may also include a groupPresence field that a bit string indicating which SSB groups are active.

The presence of the groupPresence field in SIB1 may vary depending on carrier frequency. The groupPresence field is not present for carrier frequency that is less than 24 GHz. In other words, the groupPresence field is present only above 24 GHz frequency band i.e., FR2. The 8-bit groupPresence field may be used when a carrier frequency is above 24 GHz. A first, leftmost bit may correspond to SSBs of index values 0-7, a second bit may correspond to SSBs of index values 8-15, and so on. A value of 0 in the bitmap may indicate that the SS/PBCH blocks (e.g., SSBs) are not transmitted in accordance with the inOneGroup field. A value of 1 in the bitmap may indicate that the SS/PBCH blocks (e.g., SSBs) are transmitted in accordance with the inOneGroup field.

Dedicated signaling may be used to indicate which SSBs are active. Different bitmap lengths may be supported for different frequency ranges. In some implementations, the bitmap of an ssb-PositionsInBurst field, for FR2-2, may have a length of 64 bits, regardless of a value of a corresponding $N_{SSB}^{QCL}$ parameter. The SIB1 may include an ssb-PositionsInBurst IE, which may in turn include an inOneGroup field and a groupPresence field. In some implementations, an N MSBs of the 64-bit bitmap may be used to indicate which SSBs are active. For example, when the $N_{SSB}^{QCL}$ MSB (k) is greater than or equal to 1, UE 310 may determine that SS/PBCH block(s) SSBs, within the DBTW, with candidate SSB index(es) corresponding to an SSB index equal to $N_{SSB}^{QCL}$ MSB minus 1 (e.g., k−1) may be transmitted; and if $N_{SSB}^{QCL}$ MSB (k) is set to 0, UE 310 may determine that the SSBs are not transmitted. Additionally, UE 310 may expect or anticipate that 64 minus $N_{SSB}^{QCL}$ LSB in the 64-bit bitmap is set to 0.

Examples 1000, 1100, and 1200 may include scenarios in which an indication is provided regarding which SSBs are actually transmitted when $N_{SSB}^{QCL}$ is indicated (e.g., when fewer SSBs are transmitted than a maximum number of supported SSBs (e.g., 64)). Referring to example 1000, MSBs (k) may be equal to $N_{SSB}^{QCL}$ divided by 8 MSBs of the groupPresence field in SIB1 may be used to indicate which SSB group is active. For example, when $N_{SSB}^{QCL}$ equals 32, the k may be equal to 4 MSBs (7-4) of the groupPresence field. In such a scenario, the 4 LSBs (3-0) of the groupPresence field may be reserved or not utilized, and the inOneGroup field may indicate which SSBs, within a group of SSBs, are actually transmitted.

By contrast, examples 1100 and 1200 may provide a more NQ dependent indication. For example, referring to example 1100, when $N_{SSB}^{QCL}$ is less than or equal to 16, the 8-bit strings of the inOneGroup field and the groupPresence field may be aggregated or concatenated into a 16-bit string that may be used to indicate which SSBs are active (without need of SSB grouping). UE 310 may determine, based on the concatenated bitmap, which SSBs are transmitted by base station 322. Referring now to example 1200, when $N_{SSB}^{QCL}$ is greater than 16, the 8-bit string of the groupPresence field may be used to indicate which groups are active without alteration, and the inOneGroup field may be used to indicate which SSBs are active within a group, where MSBs (k) may be equal to $N_{SSB}^{QCL}$ divided by 8. By base station 322 transmitting this information (as described in examples 10-12), UE 310 may be better enabled to monitor discovery burst transmissions for SSBs for synchronizing with base station 322.

Figure 13:
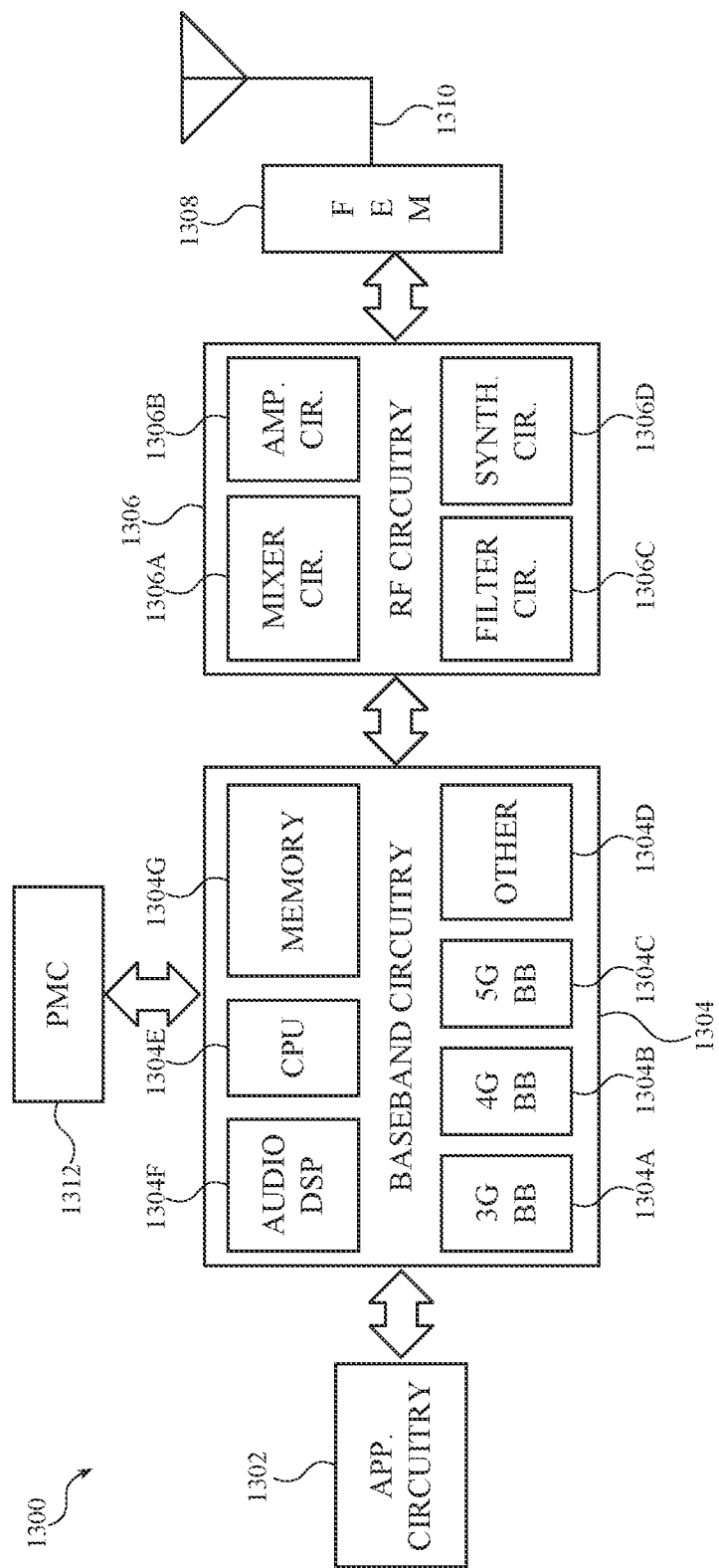
FIG. 13 is a diagram of an example of components of a device according to one or more implementations described herein.

FIG. 13 is a diagram of an example of components of a device according to one or more implementations described herein. In some implementations, the device 1300 can include application circuitry 1302, baseband circuitry 1304, RF circuitry 1306, front-end module (FEM) circuitry 1308, one or more antennas 1310, and power management circuitry (PMC) 1312 coupled together at least as shown. The components of the illustrated device 1300 can be included in a UE or a RAN node. In some implementations, the device 1300 can include fewer elements (e.g., a RAN node may not utilize application circuitry 1302, and instead include a processor/controller to process IP data received from a CN such as a 5GC or an Evolved Packet Core (EPC)). In some implementations, the device 1300 can include additional elements such as, for example, memory/storage, display, camera, sensor (including one or more temperature sensors, such as a single temperature sensor, a plurality of temperature sensors at different locations in device 1300, etc.), or input/output (I/O) interface. In other implementations, the components described below can be included in more than one device (e.g., said circuitries can be separately included in more than one device for Cloud-RAN (C-RAN) implementations).

The application circuitry 1302 can include one or more application processors. For example, the application circuitry 1302 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1300. In some implementations, processors of application circuitry 1302 can process IP data packets received from an EPC.

The baseband circuitry 1304 can include circuitry such as, but not limited to, one or more single-core or multi-core processors. The baseband circuitry 1304 can include one or more baseband processors or control logic to process baseband signals received from a receive signal path of the RF circuitry 1306 and to generate baseband signals for a transmit signal path of the RF circuitry 1306. Baseband circuitry 1304 can interface with the application circuitry 1302 for generation and processing of the baseband signals and for controlling operations of the RF circuitry 1306. For example, in some implementations, the baseband circuitry 1304 can include a 3G baseband processor 1304A, a 4G baseband processor 1304B, a 5G baseband processor 1304C, or other baseband processor(s) 1304D for other existing generations, generations in development or to be developed in the future (e.g., 2G, 6G, etc.). The baseband circuitry 1304 (e.g., one or more of baseband processors 1304A-D) can handle various radio control functions that enable communication with one or more radio networks via the RF circuitry 1306. In other implementations, some or all of the functionality of baseband processors 1304A-D can be included in modules stored in the memory 1304G and executed via a Central Processing Unit (CPU) 1304E. The radio control functions can include, but are not limited to, signal modulation/demodulation, encoding/decoding, radio frequency shifting, etc. In some implementations, modulation/demodulation circuitry of the baseband circuitry 1304 can include Fast-Fourier Transform (FFT), precoding, or constellation mapping/de-mapping functionality. In some implementations, encoding/decoding circuitry of the baseband circuitry 1304 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1304 can include one or more audio digital signal processor(s) (DSP) 1304F. The audio DSPs 1304F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1304 and the application circuitry 1302 can be implemented together such as, for example, on a system on a chip (SOC).

In some implementations, the baseband circuitry 1304 can provide for communication compatible with one or more radio technologies. For example, in some implementations, the baseband circuitry 1304 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1304 is configured to support radio communications of more than one wireless protocol can be referred to as multi-mode baseband circuitry.

RF circuitry 1306 can enable communication with wireless networks using modulated electromagnetic radiation through a non-solid medium. In various implementations, the RF circuitry 1306 can include switches, filters, amplifiers, etc. to facilitate the communication with the wireless network. RF circuitry 1306 can include a receive signal path which can include circuitry to down-convert RF signals received from the FEM circuitry 1308 and provide baseband signals to the baseband circuitry 1304. RF circuitry 1306 can also include a transmit signal path which can include circuitry to up-convert baseband signals provided by the baseband circuitry 1304 and provide RF output signals to the FEM circuitry 1308 for transmission.

In some implementations, the receive signal path of the RF circuitry 1306 can include mixer circuitry 1306A, amplifier circuitry 1306B and filter circuitry 1306C. In some implementations, the transmit signal path of the RF circuitry 1306 can include filter circuitry 1306C and mixer circuitry 1306A. RF circuitry 1306 can also include synthesizer circuitry 1306D for synthesizing a frequency for use by the mixer circuitry 1306A of the receive signal path and the transmit signal path. In some implementations, the mixer circuitry 1306A of the receive signal path can be configured to down-convert RF signals received from the FEM circuitry 1308 based on the synthesized frequency provided by synthesizer circuitry 1306D. The amplifier circuitry 1306B can be configured to amplify the down-converted signals and the filter circuitry 1306C can be a low-pass filter (LPF) or band-pass filter (BPF) configured to remove unwanted signals from the down-converted signals to generate output baseband signals. Output baseband signals can be provided to the baseband circuitry 1304 for further processing. In some implementations, the output baseband signals can be zero-frequency baseband signals, although this is not a requirement. In some implementations, mixer circuitry 1306A of the receive signal path can comprise passive mixers, although the scope of the implementations is not limited in this respect.

In some implementations, the mixer circuitry 1306A of the transmit signal path can be configured to up-convert input baseband signals based on the synthesized frequency provided by the synthesizer circuitry 1306D to generate RF output signals for the FEM circuitry 1308. The baseband signals can be provided by the baseband circuitry 1304 and can be filtered by filter circuitry 1306C.

In some implementations, the mixer circuitry 1306A of the receive signal path and the mixer circuitry 1306A of the transmit signal path can include two or more mixers and can be arranged for quadrature down conversion and up conversion, respectively. In some implementations, the mixer circuitry 1306A of the receive signal path and the mixer circuitry 1306A of the transmit signal path can include two or more mixers and can be arranged for image rejection (e.g., Hartley image rejection). In some implementations, the mixer circuitry 1306A of the receive signal path and the mixer circuitry 1306A can be arranged for direct down conversion and direct up conversion, respectively. In some implementations, the mixer circuitry 1306A of the receive signal path and the mixer circuitry 1306A of the transmit signal path can be configured for super-heterodyne operation.

In some implementations, the output baseband signals, and the input baseband signals, can be analog baseband signals, although the scope of the implementations is not limited in this respect. In some alternate implementations, the output baseband signals, and the input baseband signals, can be digital baseband signals. In these alternate implementations, the RF circuitry 1306 can include analog-to-digital converter (ADC) and digital-to-analog converter (DAC) circuitry and the baseband circuitry 1304 can include a digital baseband interface to communicate with the RF circuitry 1306.

In some dual-mode implementations, a separate radio IC circuitry can be provided for processing signals for each spectrum, although the scope of the implementations is not limited in this respect.

In some implementations, the synthesizer circuitry 1306D can be a fractional-N synthesizer or a fractional N/N+1 synthesizer, although the scope of the implementations is not limited in this respect as other types of frequency synthesizers can be suitable. For example, synthesizer circuitry 1306D can be a delta-sigma synthesizer, a frequency multiplier, or a synthesizer comprising a phase-locked loop with a frequency divider.

The synthesizer circuitry 1306D can be configured to synthesize an output frequency for use by the mixer circuitry 1306A of the RF circuitry 1306 based on a frequency input and a divider control input. In some implementations, the synthesizer circuitry 1306D can be a fractional N/N+1 synthesizer.

In some implementations, frequency input can be provided by a voltage-controlled oscillator (VCO), although that is not a requirement. Divider control input can be provided by either the baseband circuitry 1304 or the applications circuitry 1302 depending on the desired output frequency. In some implementations, a divider control input (e.g., N) can be determined from a look-up table based on a channel indicated by the applications circuitry 1302.

Synthesizer circuitry 1306D of the RF circuitry 1306 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1306D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1306 can include an IQ/polar converter.

FEM circuitry 1308 can include a receive signal path which can include circuitry configured to operate on RF signals received from one or more antennas 1310, amplify the received signals and provide the amplified versions of the received signals to the RF circuitry 1306 for further processing. FEM circuitry 1308 can also include a transmit signal path which can include circuitry configured to amplify signals for transmission provided by the RF circuitry 1306 for transmission by one or more of the one or more antennas 1310. In various implementations, the amplification through the transmit or receive signal paths can be done solely in the RF circuitry 1306, solely in the FEM circuitry 1308, or in both the RF circuitry 1306 and the FEM circuitry 1308.

In some implementations, the FEM circuitry 1308 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1306). The transmit signal path of the FEM circuitry 1308 can include a power amplifier (PA) to amplify input RF signals (e.g., provided by RF circuitry 1306), and one or more filters to generate RF signals for subsequent transmission (e.g., by one or more of the one or more antennas 1310).

In some implementations, the PMC 1312 can manage power provided to the baseband circuitry 1304. In particular, the PMC 1312 can control power-source selection, voltage scaling, battery charging, or DC-to-DC conversion. The PMC 1312 can often be included when the device 1300 is capable of being powered by a battery, for example, when the device is included in a UE. The PMC 1312 can increase the power conversion efficiency while providing desirable implementation size and heat dissipation characteristics.

While FIG. 13 shows the PMC 1312 coupled only with the baseband circuitry 1304. However, in other implementations, the PMC 1312 may be additionally or alternatively coupled with, and perform similar power management operations for, other components such as, but not limited to, application circuitry 1302, RF circuitry 1306, or FEM circuitry 1308.

In some implementations, the PMC 1312 can control, or otherwise be part of, various power saving mechanisms of the device 1300. For example, if the device 1300 is in an RRC_Connected state, where it is still connected to the RAN node as it expects to receive traffic shortly, then it can enter a state known as Discontinuous Reception Mode (DRX) after a period of inactivity. During this state, the device 1300 can power down for brief intervals of time and thus save power.

If there is no data traffic activity for an extended period of time, then the device 1300 can transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state; to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1302 and processors of the baseband circuitry 1304 can be used to execute elements of one or more instances of a protocol stack. For example, processors of the baseband circuitry 1304, alone or in combination, can be used execute Layer 3, Layer 2, or Layer 1 functionality, while processors of the baseband circuitry 1304 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 14:
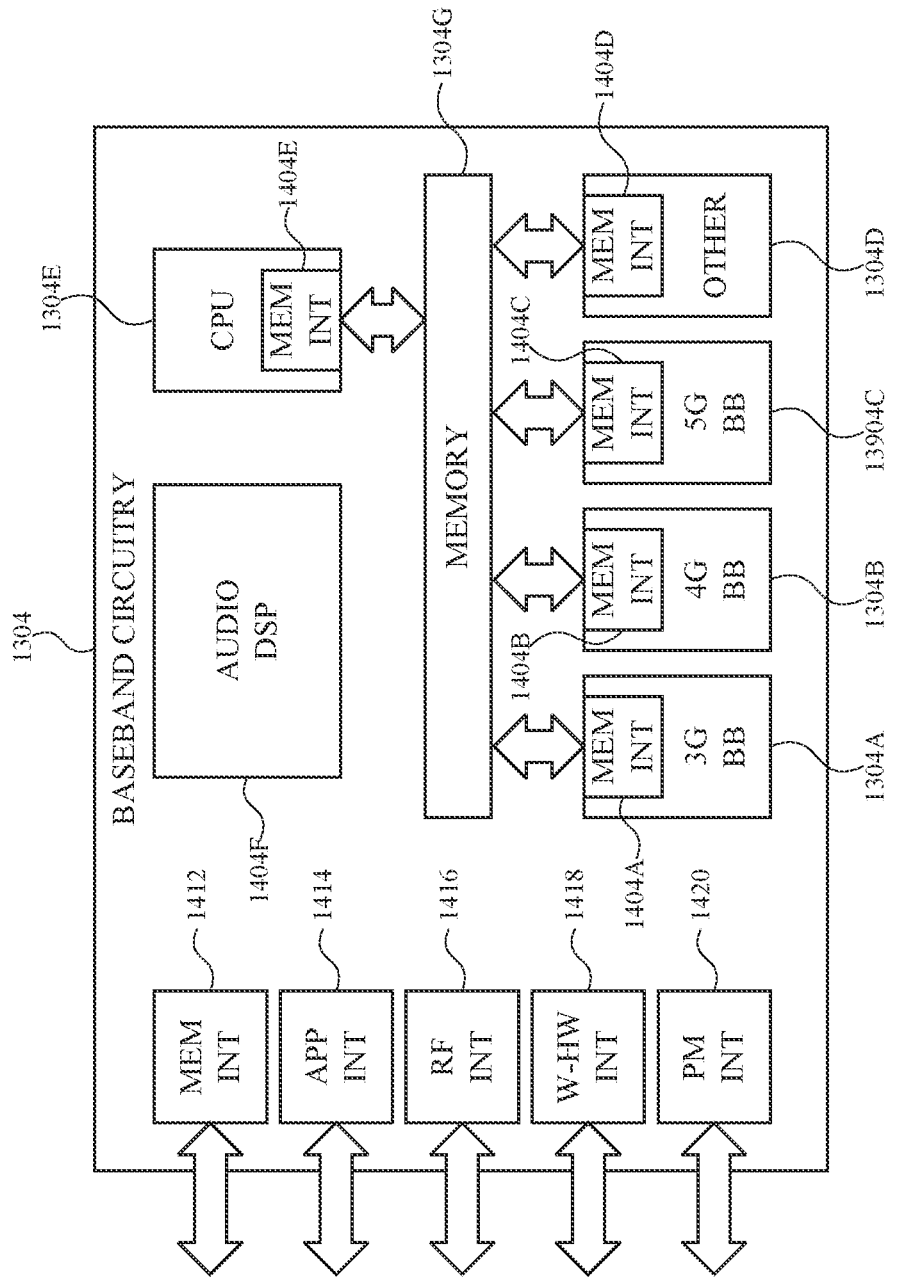
FIG. 14 is a diagram of example interfaces of baseband circuitry according to one or more implementations described herein.

FIG. 14 is a diagram of example interfaces of baseband circuitry according to one or more implementations described herein. As discussed above, the baseband circuitry 1304 of FIG. 13 can comprise processors 1304A-1304E and a memory 1304G utilized by said processors. Each of the processors 1304A-1304E can include a memory interface, 1404A-1404E, respectively, to send/receive data to/from the memory 1304G.

The baseband circuitry 1304 can further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the examples described herein, a base station may comprise a memory; and one or more processors configured to, when executing instructions stored in the memory, cause the base station to determine whether a discovery burst transmission window (DBTW) is enabled or disabled for the base station, the DBTW comprising a duration of time for transmission of a plurality of synchronization signal blocks (SSBs); communicate, to a user equipment (UE), an indication of whether the DBTW is enabled or disabled; and when the DBTW is enabled, communicate, to the UE, the plurality of SSBs in accordance with the DBTW.

In example 2, which may also include one or more of the examples described herein, the indication, of whether the DBTW is enabled or disabled, is jointly signaled with a $N_{SSB}^{QCL}$ parameter such that a value of the $N_{SSB}^{QCL}$ parameter is based on whether the DBTW is enabled or disabled. In example 3, which may also include one or more of the examples described herein, the indication, of whether the DBTW is enabled or disabled, comprises a one-bit indication of a subCarrierSpacingCommon information element (IE) of a master information block (MIB), and the value of $N_{SSB}^{QCL}$ parameter is based on the one-bit indication. In example 4, which may also include one or more of the examples described herein, the indication, of whether the DBTW is enabled or disabled, comprises a two-bit indication, and a combination of different values of the two-bit indication is configured or pre-defined in specification to indicate: one of four pre-defined values for the $N_{SSB}^{QCL}$ parameter, and whether the DBTW is enabled or disabled.

In example 5, which may also include one or more of the examples described herein, the four pre-defined values, of the one of four pre-defined values, comprises 16, 32, 48, and 64. In example 6, which may also include one or more of the examples described herein, a first bit, of the two-bit indication, comprising a subCarrierSpacingCommon IE, and a second bit, of the two-bit indication comprising one of: a least significant bit (LSB) of a ssb-SubcarrierOffset IE, a most significant bit (MSB) of a controlResourceSetZero IE, or a reserve bit of a master information block (MIB). In example 7, which may also include one or more of the examples described herein, a system information block (SIB) is used to explicitly provide the indication of whether the DBTW is enabled or disabled. In example 8, which may also include one or more of the examples described herein, the SIB is used to indicate a $N_{SSB}^{QCL}$ parameter, the $N_{SSB}^{QCL}$ parameter comprises one of four pre-defined values, the four pre-defined values comprise 16, 32, 48, and 64, and wherein the indication of whether the DBTW is enabled or disabled, and the $N_{SSB}^{QCL}$ parameter, are configured to indicate monitoring occasions (MOs) of a common search space (CSS) to the UE for system information block (SIB) reception after reception of the indication of whether the DBTW is enabled or disabled.

In example 9, which may also include one or more of the examples described herein, the one or more processors are further configured to: communicate, to the UE, an indication of whether listen-before-talk (LBT) is enabled or disabled. In example 10, which may also include one or more of the examples described herein, the SIB is used to implicitly indicate whether LBT is enabled or disabled based on a value of an $N_{SSB}^{QCL}$ parameter and a pre-defined value of the maximum number of supported SSBs ($MAX_{SSB}$) parameter. In example 11, which may also include one or more of the examples described herein, the SIB is configured to indicate a licensed radio spectrum signals or unlicensed radio spectrum signals. In example 12, which may also include one or more of the examples described herein, the indication of whether LBT is enabled or disabled for unlicensed radio spectrum signals is provided explicitly via a subCarrierSpacingCommon field of a MIB. In example 13, which may also include one or more of the examples described herein, whether LBT is enabled or disabled is indicated by selecting one scrambling sequence, from two pre-defined scrambling sequences, to scramble cyclic redundancy check (CRC) bits of public broadcast channel (PBCH).

In example 14, which may also include one or more of the examples described herein, the one or more processors are further configured to: communicate information regarding which SSBs, of the plurality of SSBs, are active within the SSB burst based on a frequency range used to communicate the SSBs. In example 15, which may also include one or more of the examples described herein, the one or more processors are further configured to: determine a number of active SSBs; and when the number of active SSBs is less than a maximum number of active SSBs, communicate, which SSBs, of the plurality of SSBs, are active within the SSB burst based on a value of an $N_{SSB}^{QCL}$ parameter. In example 16, which may also include one or more of the examples described herein, which SSBs, of the plurality of SSBs, are active, is indicated via a number of MSBs of a 64-bit bitmap information element (IE) in a dedicated radio resource control (RRC) signal for the UE, and the number of MSBs is determined as a value of an $N_{SSB}^{QCL}$ parameter.

In example 17, which may also include one or more of the examples described herein, which SSBs, of the plurality of SSBs, are active, is indicated via a number of MSBs of an 8-bit bitmap groupPresence field in SIB1, and the number of MSBs is determined based on a value of an $N_{SSB}^{QCL}$ parameter divided by 8. In example 18, which may also include one or more of the examples described herein, when a value of an $N_{SSB}^{QCL}$ parameter is less than or equal to 16, which SSBs, of the plurality of SSBs, are active, is indicated using a bitmap via a concatenation of 8 bits of an inOneGroup field and 8 bits of a groupPresence field in SIB1. In example 19, which may also include one or more of the examples described herein, when the $N_{SSB}^{QCL}$ parameter is greater than 16, which SSBs, of the plurality of SSBs, are active, is indicated via: the 8 bits of the groupPresence field in SIB1, indicating at least one SSB group as active, and a MSBs, of the 8 bits of the inOneGroup field in SIB1, indicating active SSBs within the at least one SSB group, and the MSBs, of the 8 bits of the inOneGroup field, is determined based on the value of the $N_{SSB}^{QCL}$ parameter divided by 8.

In example 20, which may also include one or more of the examples described herein, a user equipment (UE) may comprise: a memory; and one or more processors configured to, when executing instructions stored in the memory, cause the UE to: receive, from a base station of a wireless communication network, an indication of whether a discovery burst transmission window (DBTW) is enabled or disabled for the base station, the DBTW comprising transmission of a plurality of synchronization signal blocks (SSBs); and when the DBTW is enabled, receive, from the base station, at least one SSB of the plurality of SSBs in accordance with the DBTW; and synchronize signaling, with the base station, based on the at least one SSB.

In example 21, which may also include one or more of the examples described herein, a baseband processor, of a base station, may comprising circuitry configured to: determine whether a discovery burst transmission window (DBTW) is enabled or disabled for the base station, the DBTW comprising a duration of time for transmission of a plurality of synchronization signal blocks (SSBs); communicate, to a user equipment (UE), an indication of whether the DBTW is enabled or disabled; and when the DBTW is enabled, communicate, to the UE, the plurality of SSBs in accordance with the DBTW.

In example 22, which may also include one or more of the examples described herein, a baseband processor, of a UE, may comprising circuitry configured to: receive, from a base station of a wireless communication network, an indication of whether a discovery burst transmission window (DBTW) is enabled or disabled for the base station, the DBTW comprising transmission of a plurality of synchronization signal blocks (SSBs); and when the DBTW is enabled, receive, from the base station, at least one SSB of the plurality of SSBs in accordance with the DBTW; and synchronize signaling, with the base station, based on the at least one SSB.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given, or particular, application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A base station, comprising:
   a memory; and
   one or more processors configured to, when executing instructions stored in the memory, cause the base station to:
      communicate, to a user equipment (UE), an indication of whether a discovery burst transmission window (DBTW) is enabled and a synchronization signal blocs (SSB) parameter, the DBTW comprising a duration of time for transmission of a plurality of synchronization signal blocks (SSBs), and the SSB parameter representing a number of the plurality of SSBs associated with quasi-co-location (QCL); and
      indicate, via a number of bits of a first bitmap in a system information block (SIB), which SSBs of the plurality of SSBs are active, the number of bits being determined based on a value of the SSB parameter divided by 8; and
      communicate, to the UE, active SSBs of the plurality of SSBs based on the first bitmap.

2. The base station of claim 1, wherein the indication is jointly signaled with the SSB parameter.

3. The base station of claim 1, wherein:
   a one-bit indication of a subCarrierSpacingCommon information element (IE) of a master information block (MIB) is mapped to a value of the SSB parameter.

4. The base station of claim 1, wherein:
   the indication comprises a two-bit indication, and
   a combination of different values of the two-bit indication is configured or pre-defined in specification to indicate:
      one of four pre-defined values for the SSB parameter, and whether the DBTW is enabled.

5. The base station of claim 4, wherein the four pre-defined values comprise 16, 32, 48, and 64.

6. The base station of claim 4, wherein:
   a first bit, of the two-bit indication, comprising a subCarrierSpacingCommon IE, and
   a second bit, of the two-bit indication comprising one of:
      a least significant bit (LSB) of a ssb-SubcarrierOffset IE,
      a most significant bit (MSB) of a controlResourceSetZero IE, or
      a reserve bit of a master information block (MIB).

7. The base station of claim 1, wherein the SIB is used to explicitly provide the indication.

8. The base station of claim 7, wherein:
   the SIB is used to indicate the SSB parameter,
   the SSB parameter comprises one of four pre-defined values,
   the four pre-defined values comprise 16, 32, 48, and 64, and wherein the indication and the SSB parameter are configured to indicate monitoring occasions (MOs) of a common search space (CSS) to the UE for SIB reception after reception of the indication.

9. The base station of claim 7, wherein the one or more processors are further configured to:
communicate, to the UE, an indication of whether listen-before-talk (LBT) is enabled or disabled.

10. The base station of claim 9, wherein the SIB is used to implicitly indicate whether LBT is enabled or disabled based on a value of the SSB parameter and a pre-defined value of another SSB parameter representing the maximum number of supported SSBs.

11. The base station of claim 9, wherein the SIB is configured to indicate a licensed radio spectrum signals or unlicensed radio spectrum signals.

12. The base station of claim 9, wherein the indication of whether LBT is enabled or disabled for unlicensed radio spectrum signals is provided explicitly via a SubCarrierSpacingCommon field of a master information block (MIB).

13. The base station of claim 9, wherein whether LBT is enabled or disabled is indicated by selecting one scrambling sequence, from two pre-defined scrambling sequences, to scramble cyclic redundancy check (CRC) bits of public broadcast channel (PBCH).

14. The base station of claim 1, wherein the one or more processors are further configured to:
communicate information regarding which SSBs, of the plurality of SSBs, are active based on a frequency range used to communicate the active SSBs.

15. The base station of claim 1, wherein:
which SSBs, of the plurality of SSBs, are active, is indicated via a number of most significant bits (MSBs) of a 64-bit bitmap information element (IE) in a dedicated radio resource control (RRC) signal for the UE, and
the number of MSBs is determined as a value of the SSB parameter.

16. The base station of claim 1, wherein:
which SSBs, of the plurality of SSBs, are active, is indicated via a second bitmap of 8 bits.

17. The base station of claim 1, wherein:
when a value of the SSB parameter is less than or equal to 16,
which SSBs, of the plurality of SSBs, are active, is indicated via a concatenation of 8 bits of a second bitmap and two most significant bits (MSBs) of the first bitmap in the SIB.

18. The base station of claim 1, wherein:
the first bitmap has 8 bits and indicates at least one SSB group as active.

19. A user equipment (UE), comprising:
a memory; and
one or more processors configured to, when executing instructions stored in the memory, cause the UE to:
receive, from a base station of a wireless communication network, an indication of whether a discovery burst transmission window (DBTW) is enabled for the base station and a synchronization signal blocs (SSB) parameter, the DBTW comprising a duration of time for transmission of a plurality of synchronization signal blocks (SSBs), and the SSB parameter representing a number of the plurality of SSBs associated with quasi-co-location (QCL);
receive, from the base station, at least one SSB of the plurality of SSBs in accordance with the DBTW; and
synchronize signaling, with the base station, based on the at least one SSB,
wherein a time domain position of the at least one SSB is indicated by a system information block (SIB) including a first bitmap indicating at least one SSB group and a second bitmap indicating the at least one SSB within the at least one SSB group based on the SSB parameter.

20. The UE of claim 19, wherein the indication, is jointly signaled with the SSB parameter.

21. The UE of claim 19, wherein:
a one-bit indication of a subCarrierSpacingCommon information element (IE) of a master information block (MIB) is mapped to a value of the SSB parameter.

22. The UE of claim 20, wherein:
the indication comprises a two-bit indication, and
a combination of different values of the two-bit indication is configured or pre-defined in specification to indicate:
one of four pre-defined values for the SSB parameter, and
whether the DBTW is enabled or disabled.

23. The UE of claim 22, wherein the four pre-defined values comprise 16, 32, 48, and 64.

24. The UE of claim 23, wherein:
a first bit, of the two-bit indication, comprising a subCarrierSpacingCommon IE, and
a second bit, of the two-bit indication comprising one of:
a least significant bit (LSB) of a ssb-SubcarrierOffset IE,
a most significant bit (MSB) of a controlResourceSetZero IE, or
a reserve bit of a master information block (MIB).

25. The UE of claim 19, wherein the SIB is used to explicitly provide the indication.

26. The UE of claim 19, wherein:
the SSB parameter comprises one of four pre-defined values of a pre-defined set of SSB parameter values,
the four pre-defined values comprise 16, 32, 48, and 64.

27. The UE of claim 26, wherein the smallest value in the pre-defined set of SSB parameter values is used to determine monitoring occasions (MOs) of a common search space (CSS) for SIB reception before the SSB parameter is received.

28. The UE of claim 25, wherein the one or more processors are further configured to:
receive, from the base station, an indication of whether listen-before-talk (LBT) is enabled or disabled.

29. The UE of claim 28, wherein the SIB is used to implicitly indicate whether LBT is enabled or disabled based on a value of the SSB parameter and a pre-defined value of another SSB parameter representing the maximum number of supported SSBs.

* * * * *